United States Patent
Nishimoto et al.

(10) Patent No.: US 6,665,394 B1
(45) Date of Patent: Dec. 16, 2003

(54) NETWORK CALL CONTROL SYSTEM

(75) Inventors: Norihito Nishimoto, Fukuoka (JP);
Seiji Tokunaga, Fukuoka (JP);
Kazuhiro Muraoka, Fukuoka (JP);
Akio Yonehara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/397,200

(22) Filed: Sep. 16, 1999

(30) Foreign Application Priority Data

Dec. 16, 1998 (JP) .......................................... 10-357836

(51) Int. Cl.[7] .............................................. H04M 7/00
(52) U.S. Cl. ............................ 379/220.01; 379/221.15; 379/229
(58) Field of Search ........................ 379/219, 220.01, 379/225, 229, 230, 221.15; 370/351, 410

(56) References Cited

U.S. PATENT DOCUMENTS 5,226,075 A * 7/1993 Funk et al. .................. 379/243
5,455,855 A * 10/1995 Hokari ........................ 379/196
5,539,817 A * 7/1996 Wilkes ........................ 370/410

FOREIGN PATENT DOCUMENTS

JP 3-125551 5/1991

* cited by examiner

Primary Examiner—Benny Tieu
(74) Attorney, Agent, or Firm—Katten Muchin Zavis Rosenman

(57) ABSTRACT

A network includes a plurality of exchanges and a service station which carries out network services. Each exchange of the plurality of exchanges and the service station are connected through a call control signal line. Respective exchanges of the plurality of exchanges are connected through circuits. Each exchange of the plurality of exchanges includes a virtual-index capture processing portion which captures a virtual circuit identification index, and the exchange specifies the virtual circuit identification index and makes a call-out request to the service station.

6 Claims, 25 Drawing Sheets

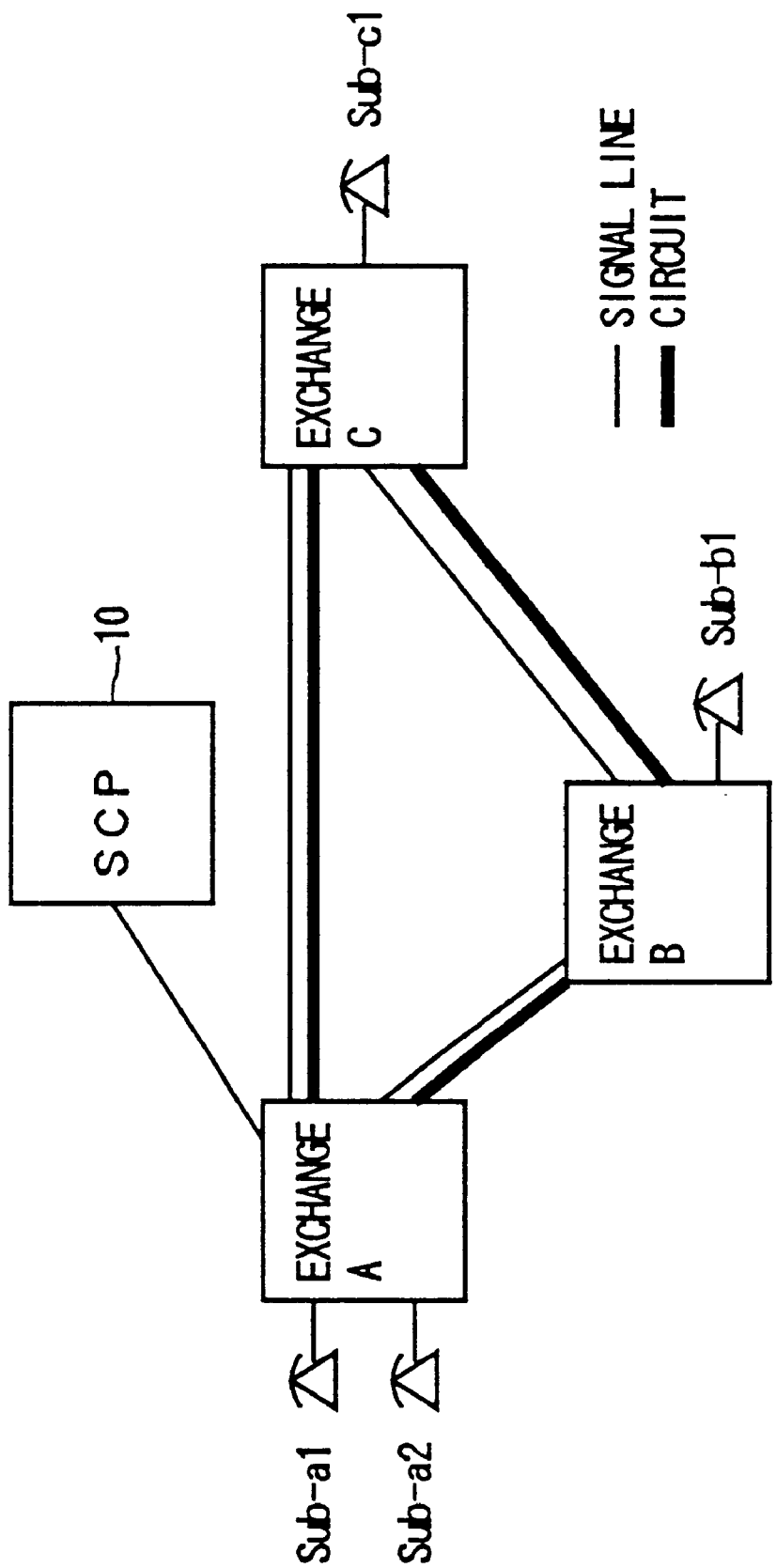

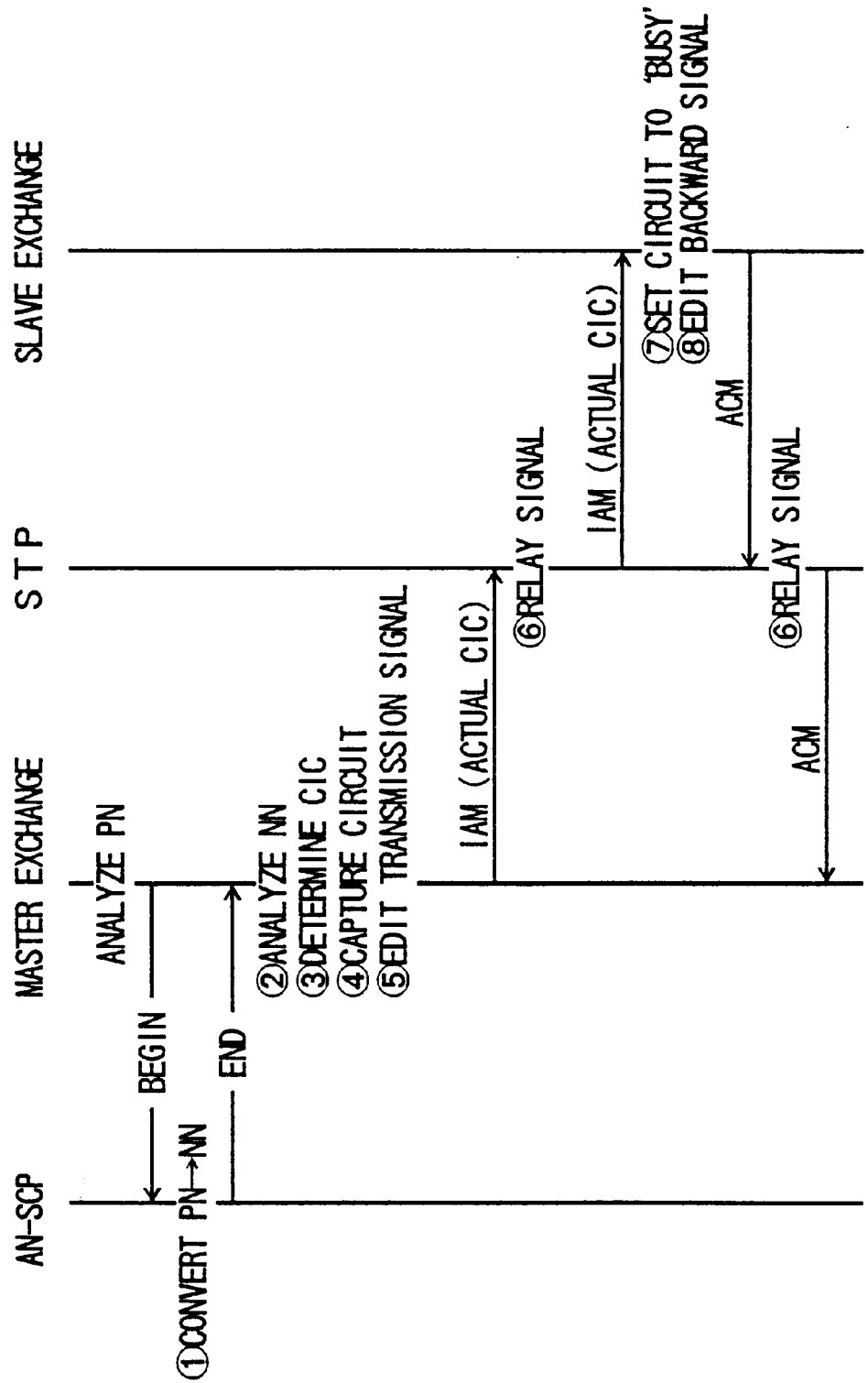

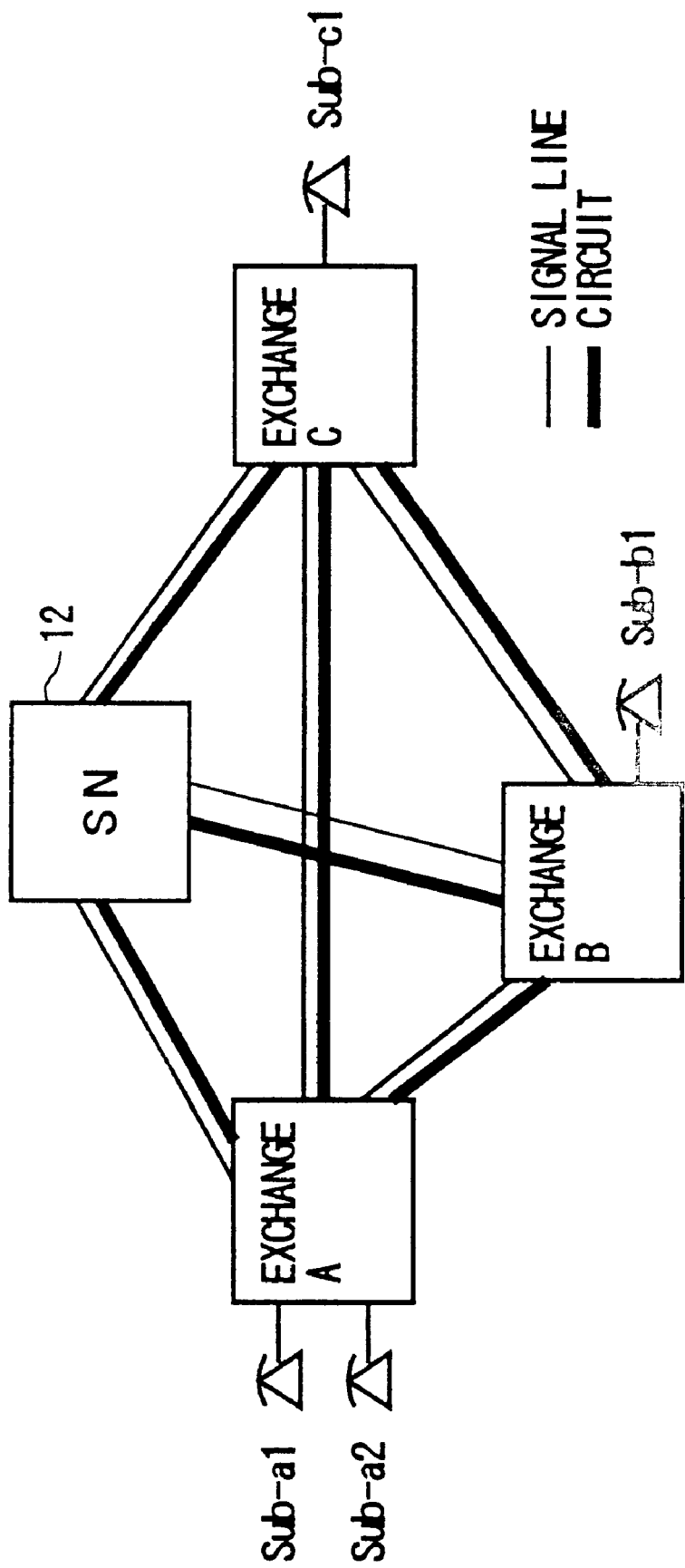

F I G. 5
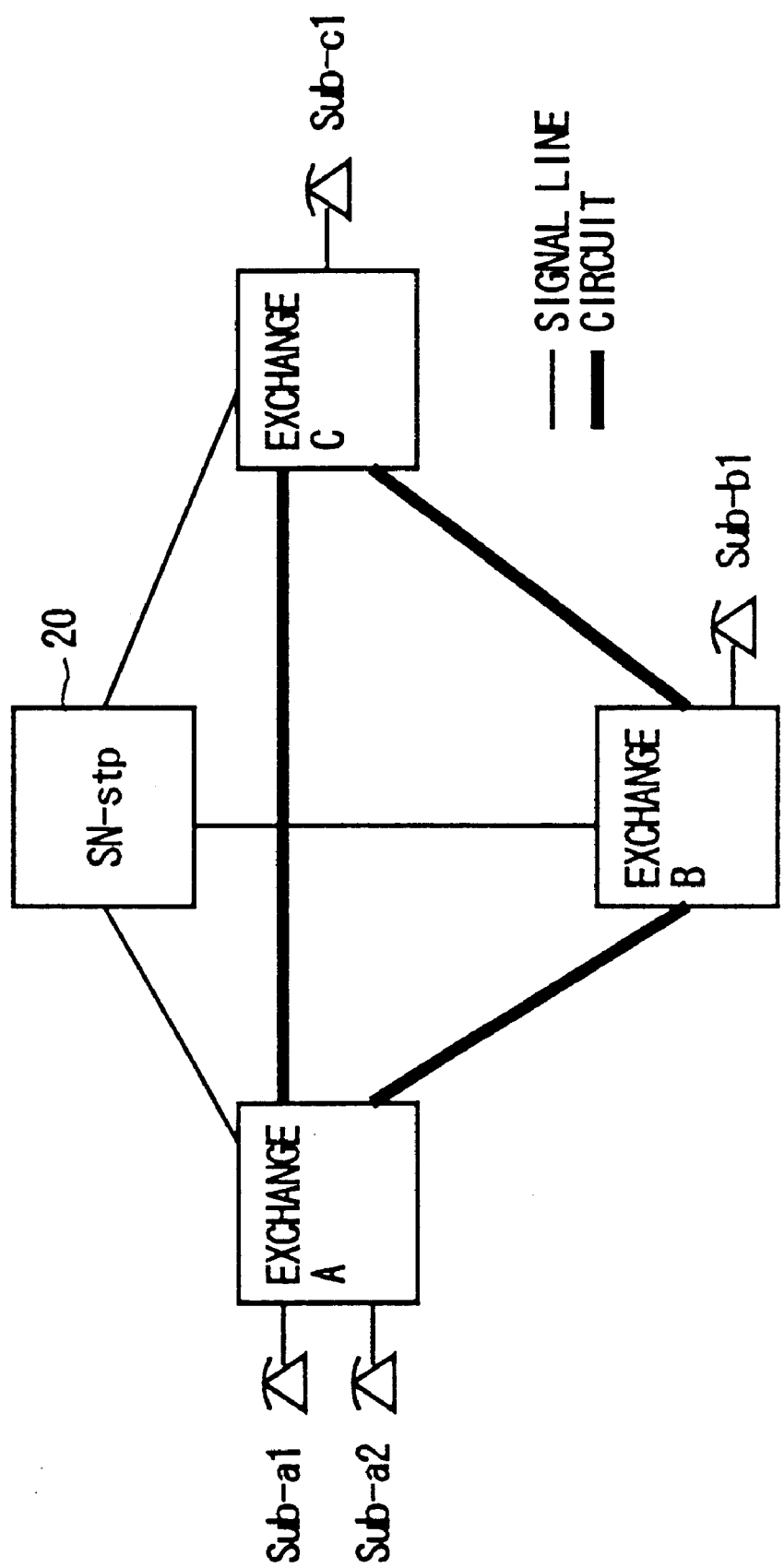

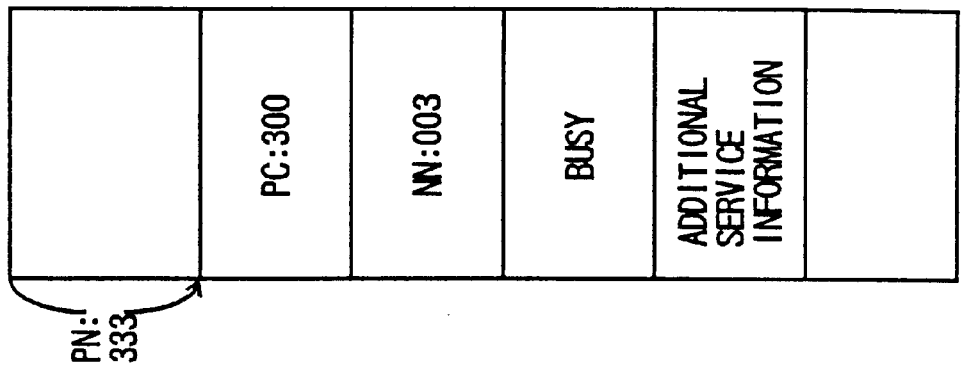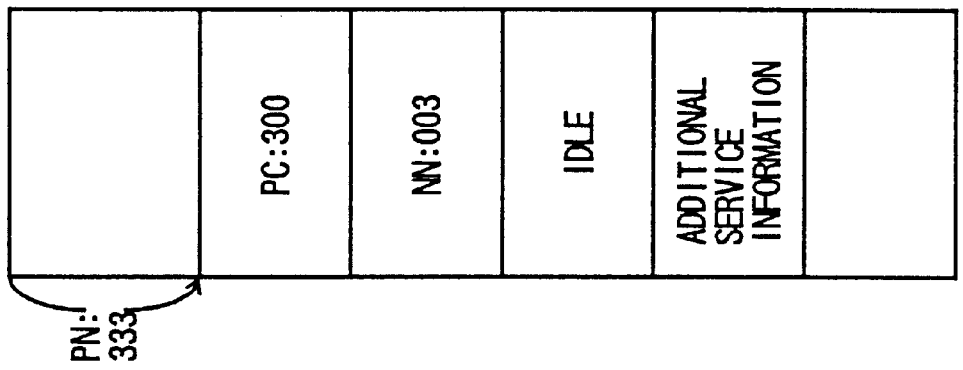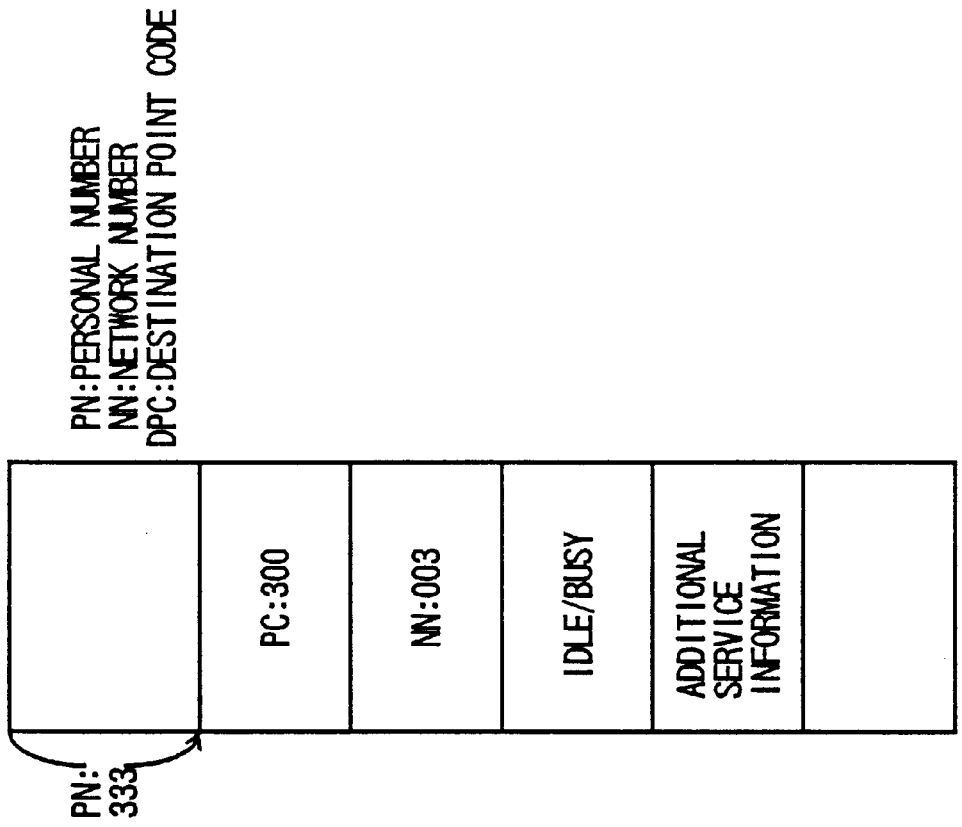

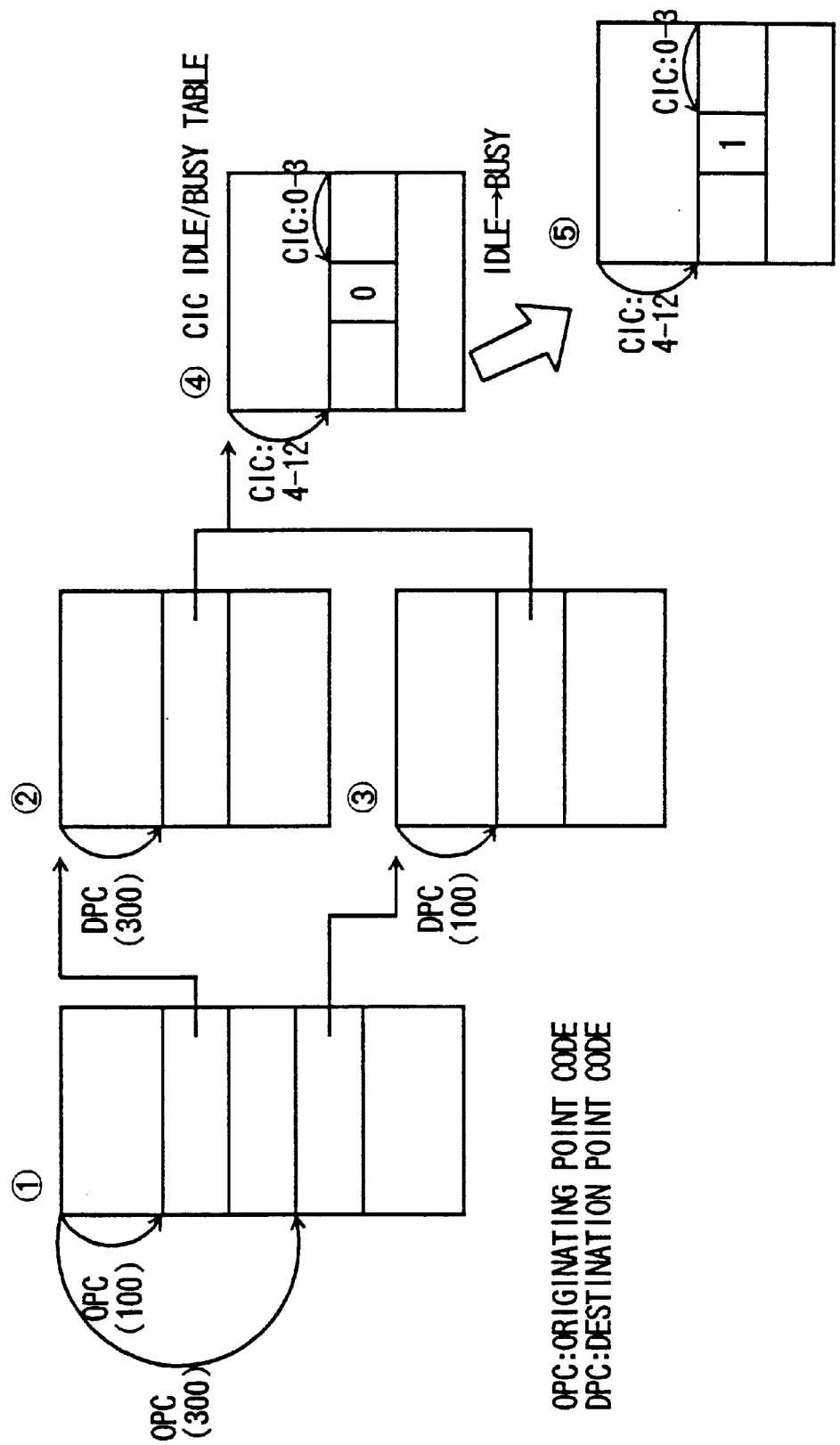

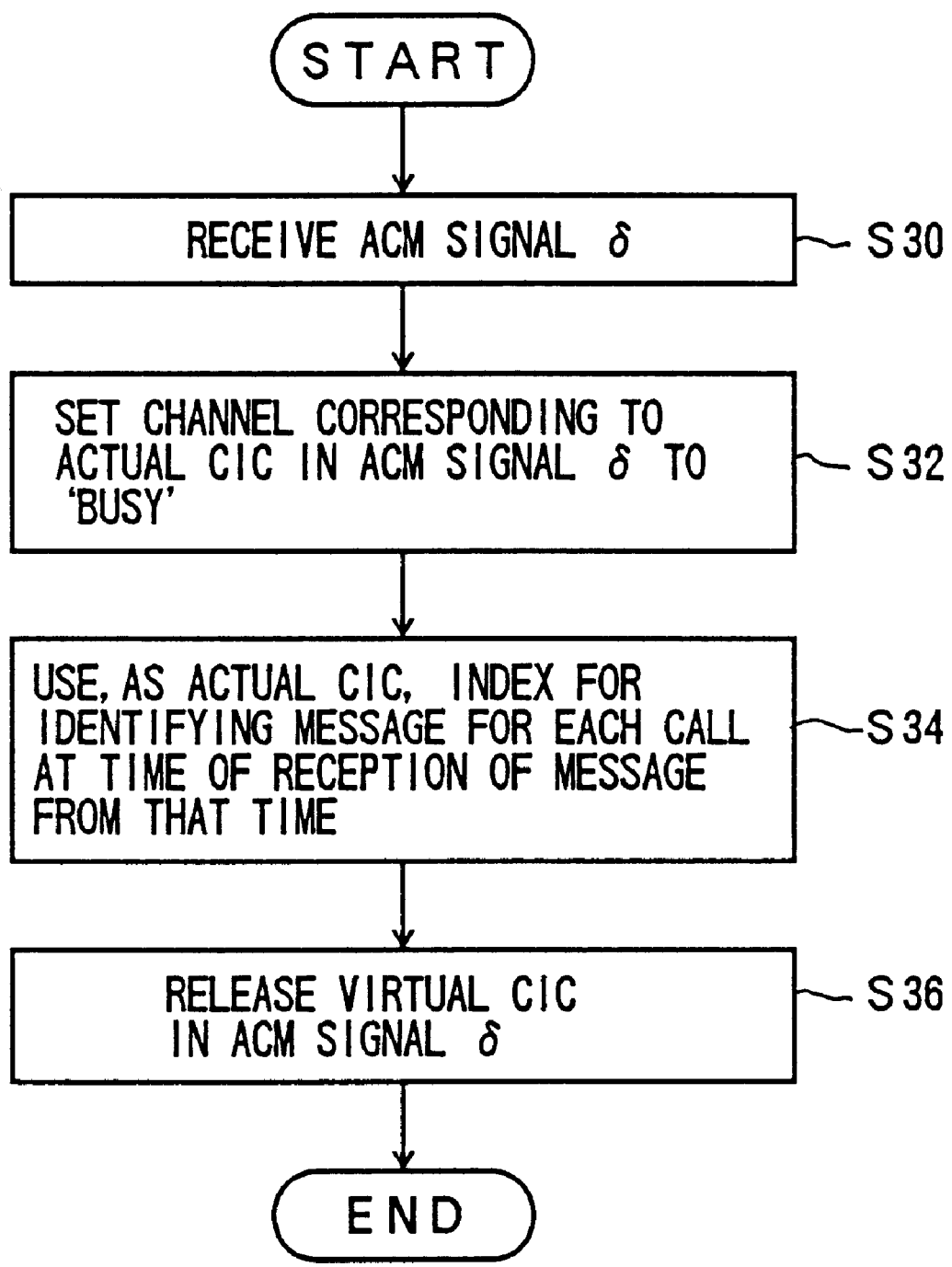

OPC:ORIGINATING POINT CODE
DPC:DESTINATION POINT CODE
PN:PERSONAL NUMBER

F I G. 2 1
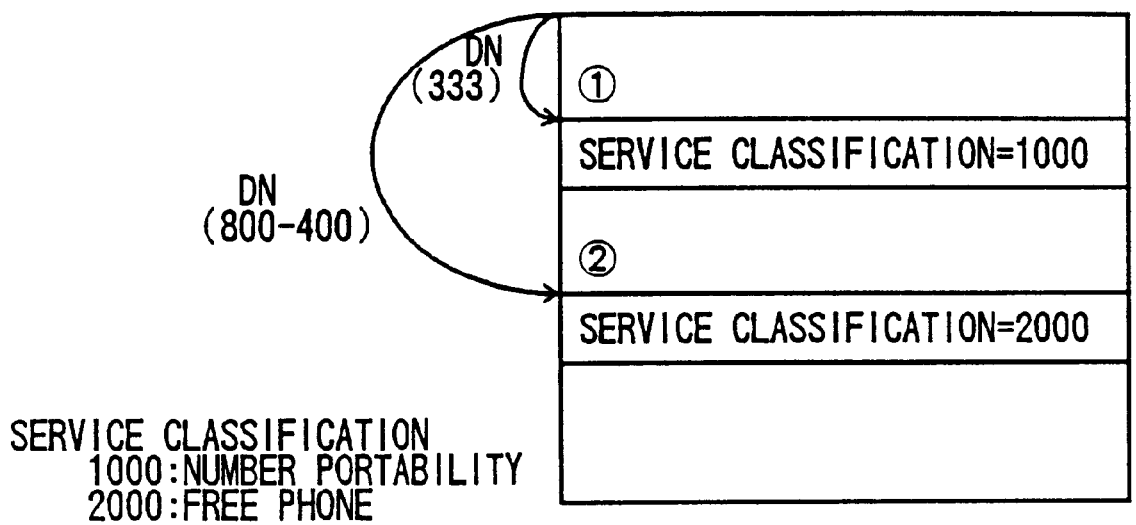

FIG. 22A

IAM

| | |
|---|---|
| OPC | 100 |
| DPC | 200 |
| CIC | 010000000001 (VIRTUAL) |
| CIC-2 | NULL |
| DN(PN) | 333 |
| DN(NN) | NULL |
| | ⋮ |

IN CASE OF NUMBER PORTABILITY

FIG. 22B

IAM

| | |
|---|---|
| OPC | 100 |
| DPC | 200 |
| CIC | 100000000001 (VIRTUAL) |
| CIC-2 | NULL |
| DN(PN) | 333 |
| DN(NN) | NULL |
| | ⋮ |

IN CASE OF FREE PHONE

NETWORK CALL CONTROL SYSTEM

BACKGROUND OF THE INVENTION

1. Field of the Invention

The present invention relates to a network call control system, in particular, to a network call control system which carries out high-grade services such as number portability and so forth.

2. Description of the Related Art

As one of measures for achieving proper competition between telephone companies, there are high-grade services such as number portability. The number portability is a service which enables a subscriber to use a telephone number particular to the subscriber wherever the subscriber is registered in a network, and enables the subscriber to move.

In the related art, in order to realize the above-mentioned high-grade services, there is a method of using an advance intelligent network (AIN). FIG. 1 shows an arrangement of one example of the advance intelligent network which realizes the high-grade services. In the figure, exchanges A, B and C are mutually connected by call control signal lines (which will be simply referred to as signal lines hereinafter) for control channels and circuits. An SCP (Service Control Point) 10 in the advanced intelligent network is connected to the exchange A by the signal line. For connection between the exchange A and SCP 10, generally, a TCAP (Transaction Capabilities Application Part) protocol is used.

In this case, when a master subscriber Sub-a1 of the exchange A dials a subscriber directory number PN (=personal directory number), to which number the number portability is applied, the exchange A inquires of the SCP 10 through the-signal line in order to obtain an actual slave directory number NN (=network directory number) from this dial number DN. When the exchange A receives the slave directory number NN from the SCP 10, the exchange A analyzes the dial number DN again, performs route determination and capture of the circuit, and sends a call-out signal to the slave station (for example, the exchange C). FIG. 2 shows a channel capture sequence at this time.

Further, recently, there is a method in which the above-mentioned high-grade services are realized using an SN (Service Node) station, shown in FIG. 3, which is obtained as a result of functions similar to those of the SCP being added to an exchange. The exchanges A, B and C are mutually connected by the signal lines for the control channels and the circuits. Further, each of the exchanges A, B and C, and the SN station 12 are connected by the signal line and the circuit in the common-line signal system. Because the SN station also acts as an exchange node, an ISUP (ISDN User Part) which is a basic protocol for exchange nodes is used for connection between each of the exchanges A, B and C, and the SN station 12.

In this case, when the master subscriber Sub-a1 dials the subscriber number PN (=personal number), to which number the number portability is applied, the exchange A captures the circuit between the exchange A and the SN station 12, and, then, sends the call-out signal to the SN station, in order to obtain the actual slave number NN (=network number) from this dial number DN.

When the SN station 12 converts the subscriber number PN into the slave number NN, the SN station 12 sets the conversion result in a call release signal as additional information, and sends it to the exchange A. (Here, in order to release the circuit between the exchange A and the SN station 12, sending of the call release signal is needed.) When the exchange A receives the slave number NN through the call release signal from the SN station 12, the exchange A analyzes the dial number DN again, performs route determination and capture of the circuit, and sends the call-out signal to the slave station (for example, the exchange C). The channel capture sequence at this time is shown in FIG. 4.

In the case where the TCAP protocol is used in the advanced intelligent network in the related art, it is necessary to load the TCAP protocol in each exchange. Further, when the number of kinds of the high-grade services to be provided increases, functions should be added not only on the side of the SCP 10 but also on the side of each exchange. Therefore, it is difficult to provide the services timely.

Further, in the high-grade service such as the number portability, the signal traffic can be reduced when the signal is sent out from the exchange at the time at which the slave number NN is determined. However, because the TCAP is a protocol which cannot deal with lines, it is necessary that the SCP 10 is sure to return the control to the master exchange A, and the master exchange A captures the circuit between the master exchange A and the slave station.

Further, in the case where the high-grade services are realized through the SN station having the exchange function, the ISUP which is the basic protocol for exchange nodes is used for the connection between each exchange and the SN station 12. Therefore, the circuit should be captured, and the signal traffic increases.

SUMMARY OF THE INVENTION

The present invention has been devised in consideration of the above-mentioned points, and an object of the present invention is to provide a network call control system in which an increase in the number of kinds of the services to be provided can be coped with simply through addition of functions in the service station, and an increase in the signal traffic can be prevented at the time of the call-out request.

In a network call control system according to the present invention, in which system a network comprises a plurality of exchanges, each exchange of the plurality of exchanges and a service station, which carries out network services, being connected through a call control signal line, and the respective exchanges of the plurality of exchanges being connected through circuits, each exchange of the plurality of exchanges comprises a virtual-index capture processing portion which captures a virtual circuit identification index; and the exchange specifies the virtual circuit identification index and makes a call-out request to the service station.

In this system, because the virtual circuit identification index is specified and the call-out request is made to the service station using the call control signal line, it is not necessary to capture the circuit at the time of the-call-out request. Thereby, it is possible to prevent an increase in the signal traffic.

Each exchange of the plurality of exchanges may comprise a replacement processing portion which receives a response signal sent from an opposite station in response to the call-out request, and replaces the virtual circuit identification index with an actual circuit identification index.

In this arrangement, because each exchange receives the response signal sent from the opposite station in response to the call-out request, and replaces the virtual circuit identification index with the actual circuit identification index, the circuit can be determined based on the actual circuit identification index.

The service station may comprise an intra-network inter-station management portion which manages the circuit identification indexes between the respective exchanges of the plurality of exchanges; and the service station receives the call-out request and captures the actual circuit identification index.

In this arrangement, because the service station manages the circuit identification indexes between the respective exchanges of the plurality of exchanges, receives the call-out request and captures the actual circuit identification index, it is possible to determine the slave exchange when the call-out request occurs from the master exchange, and to determine the circuit.

The service station may comprise an intra-network calling condition management portion which manages a calling condition for each dial number.

In this arrangement, because the service station manages the calling condition for each dial number, it is possible to determine whether or not connection to the slave subscriber is possible, to perform 'busy' processing when the connection is not possible so as to prevent resources in the network from being uselessly captured, and to reduce the load on the exchange.

Each exchange of the plurality of exchanges may comprise a service-information setting processing portion which adds service identification information to the virtual circuit identification index in accordance with a result of analysis of a dial number.

In this arrangement, because each exchange adds the service identification information to the virtual circuit identification index in accordance with the result of the analysis of the dial number, the service station can determine, from the virtual circuit identification index, the service to be carried out.

The service station may comprise a service determination processing portion which determines, from service identification information added to the virtual circuit identification index, the service to be carried out.

In this arrangement, because the service station determines, from the service identification information added to the virtual circuit identification index, the service to be carried out, it is possible to reduce the processing time.

Other objects and further features of the present invention will become more apparent from the following detailed description when read in conjunction with the accompanying drawings.

BRIEF DESCRIPTION OF DRAWINGS

FIG. 1 shows an arrangement of one example of an advanced intelligent network;

FIG. 2 shows a channel capture sequence for the network shown in FIG. 1;

FIG. 3 shows an arrangement of one example of a network using a service node;

FIG. 5 shows an arrangement of one embodiment of a network in a network call control system according to the present invention;

FIGS. 12A, 12B and 12C show DN analysis data;

FIG. 13 shows an inter-station calling-CIC idle/busy table;

FIG. 14 shows a flow chart of a second embodiment of an exchange operation at a time of reception of an ACM signal δ;

FIG. 21 shows a DN analysis table;

FIGS. 22A and 22B show an IAM signal;

DETAILED DESCRIPTION OF THE PREFERRED EMBODIMENTS

FIG. 5 shows an arrangement of one embodiment of a network in a network call control system according to the present invention. In the figure, exchanges A, B and C are connected with each other by circuits. Thus, the network is formed. An SN-stp station 20 as a network control station has a network information management function and a network service control function. The SN-stp station 20 is connected with each of the exchanges A, B and C by a signal line. The network service control function is a function for carrying out various high-grade services such as number portability. In this network, signal links between the respective exchanges A, B and C pass through the SN-stp station 20.

Figure 4:
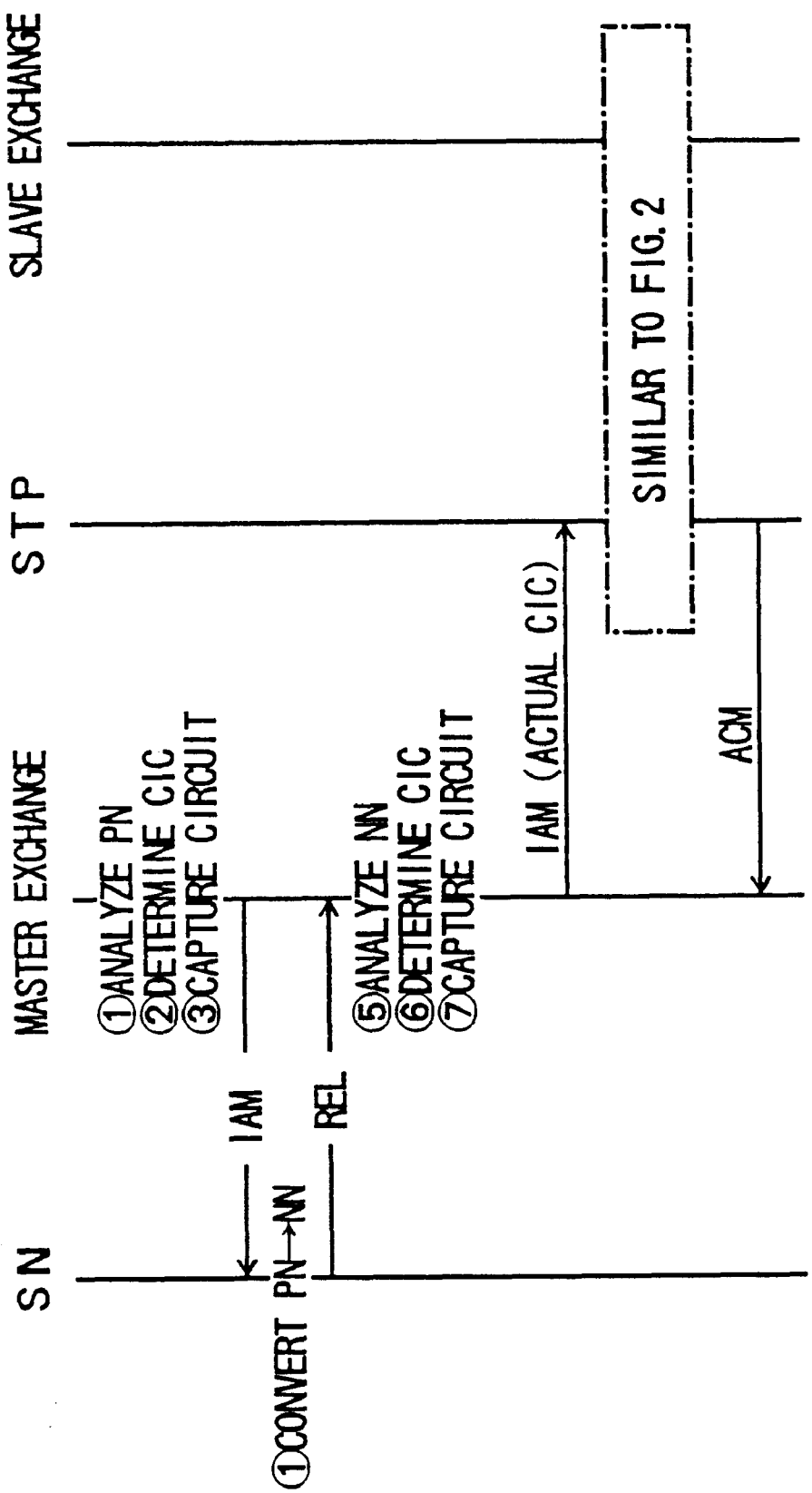
FIG. 4 shows a channel capture sequence for the network shown in FIG. 3.
Figure 6:
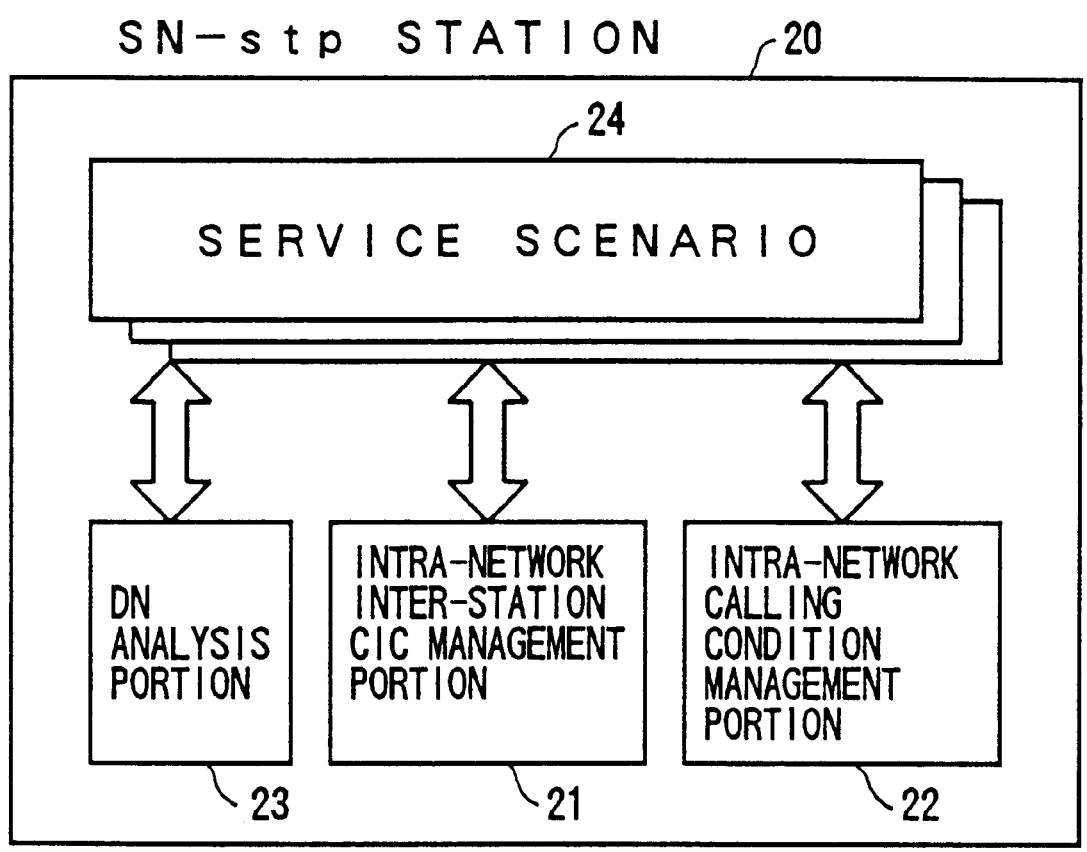
FIG. 6 shows a block diagram of a first embodiment of an SN-stp station.

FIG. 6 shows a block diagram of a first embodiment of the SN-stp station. In the figure, an intra-network inter-station CIC management portion 21 manages the circuits between the exchanges A, B and C which are connected with the SN-stp station 20. Here, a CIC (Circuit Identification Code) is an index (circuit identifying index) for identifying the circuit to be used. An intra-network calling-condition management portion 22 manages the calling condition for each dial number DN. A DN analysis portion 23 analyzes the dial number DN transmitted from the exchange, and determines which service scenario of a plurality of service scenarios 24 will be used.

Figure 7:
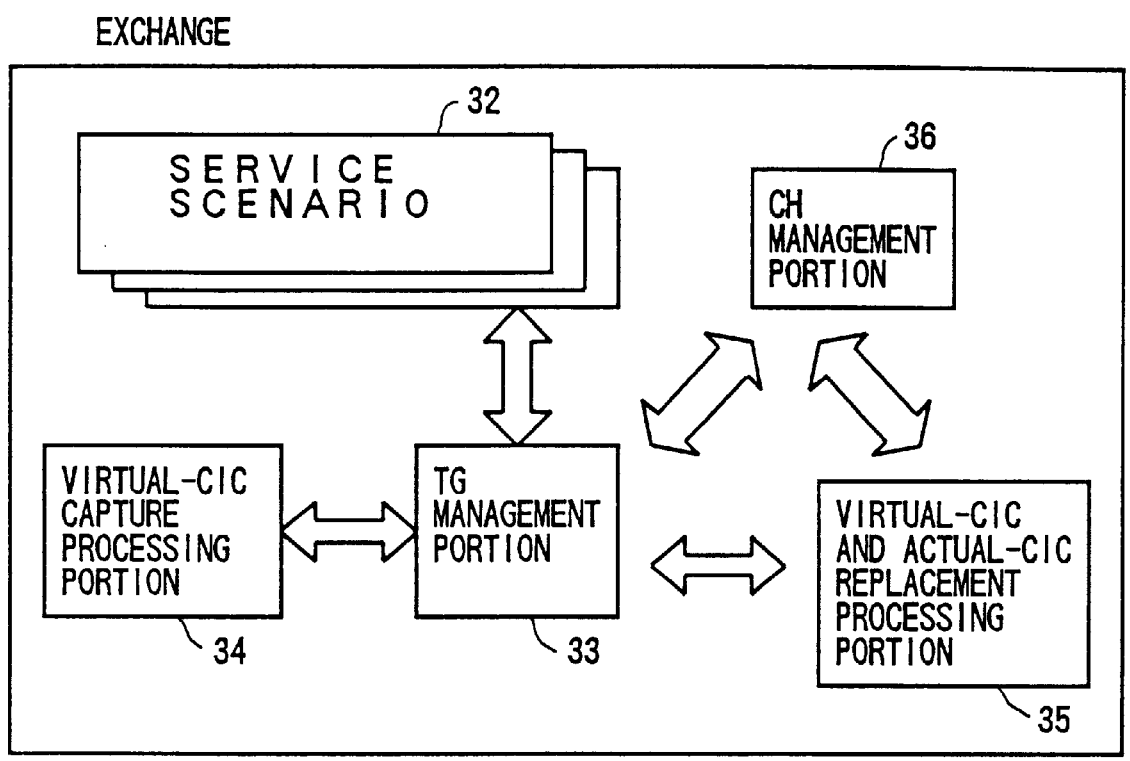
FIG. 7 shows a block diagram of a first embodiment of each exchange.

FIG. 7 shows a block diagram of a first embodiment of each exchange. In the figure, service scenarios 32 for various high-grade services request a TG (Trunk Group) management portion 33 to capture the corresponding TG in accordance with the dial number DN from the master subscriber. The TG management portion 33 requests a virtual-CIC capture processing portion 34 to capture a virtual CIC. The virtual-CIC capture processing portion 34 determines not an actual circuit but a channel number of a circuit in a virtual manner. The TG management portion 33 sends a call-out request signal having this virtual CIC to the SN-stp station 20.

A virtual-CIC and actual-CIC replacement processing portion 35 receives a response signal which has passed through the SN-stp station 20 from an opposite exchange in response to the call-out request signal, and replaces the virtual CIC in the response signal with an actual CIC. A CH management portion 36 manages the circuits which connect the exchanges, and secures the circuit, to which the above-mentioned actual CIC points.

Figure 8:
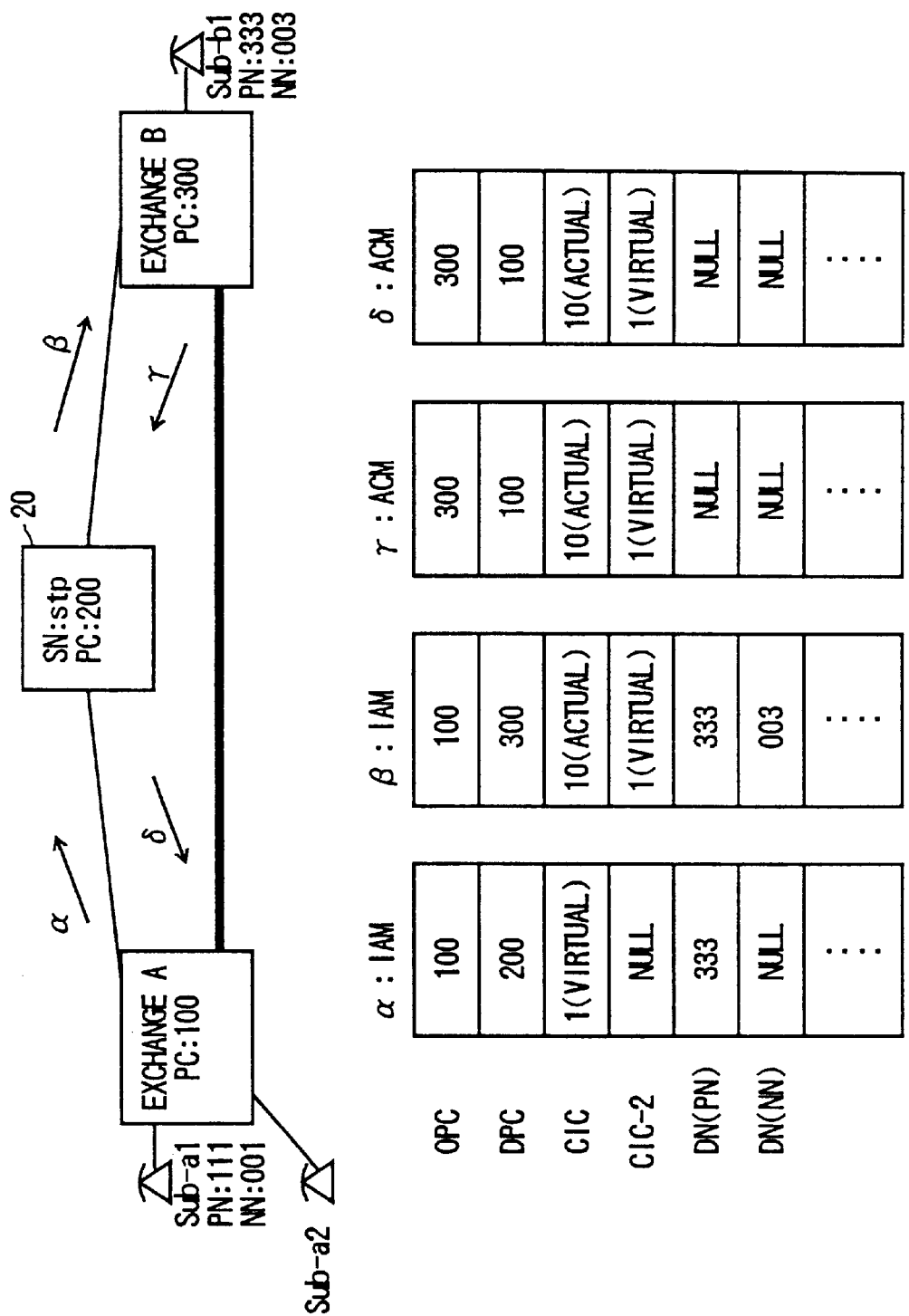
FIG. 8 shows a general arrangement of a network.
Figure 9:
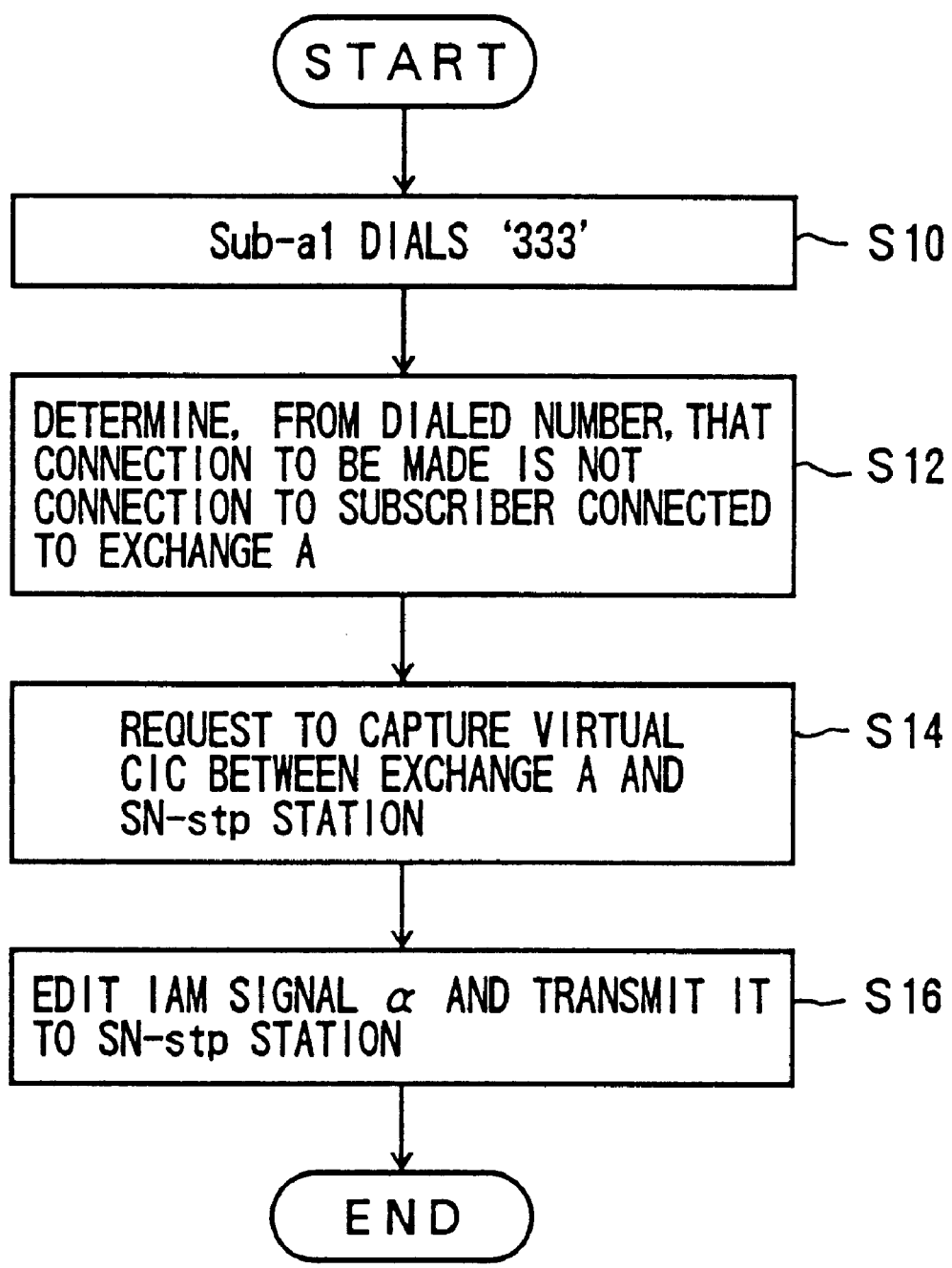
FIG. 9 shows a flow chart of a first embodiment of an exchange operation at a time of call establishment.
Figure 10:
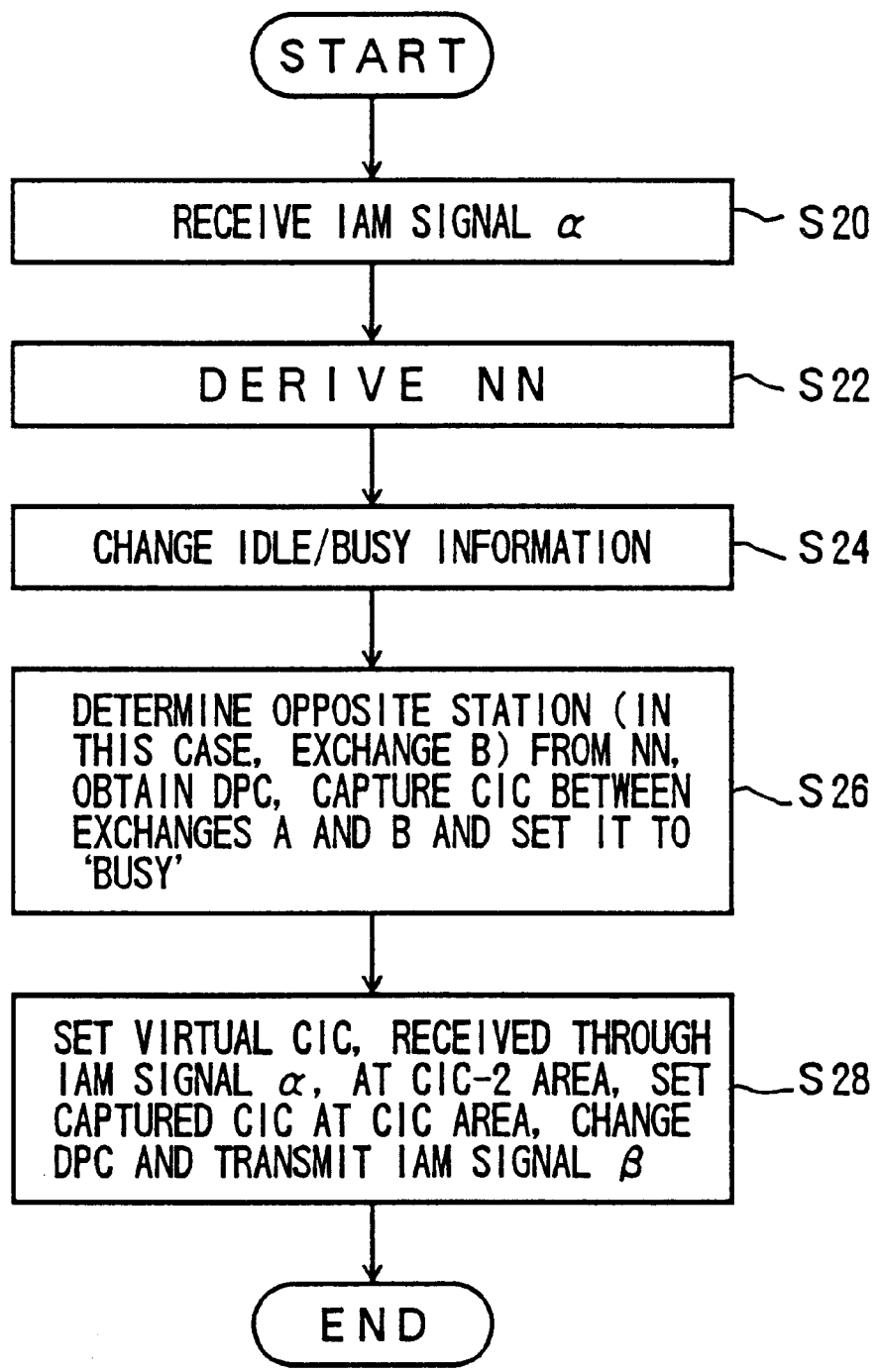
FIG. 10 shows a flow chart of a first embodiment of an SN-stp-station operation at the time of call establishment.
Figure 11:
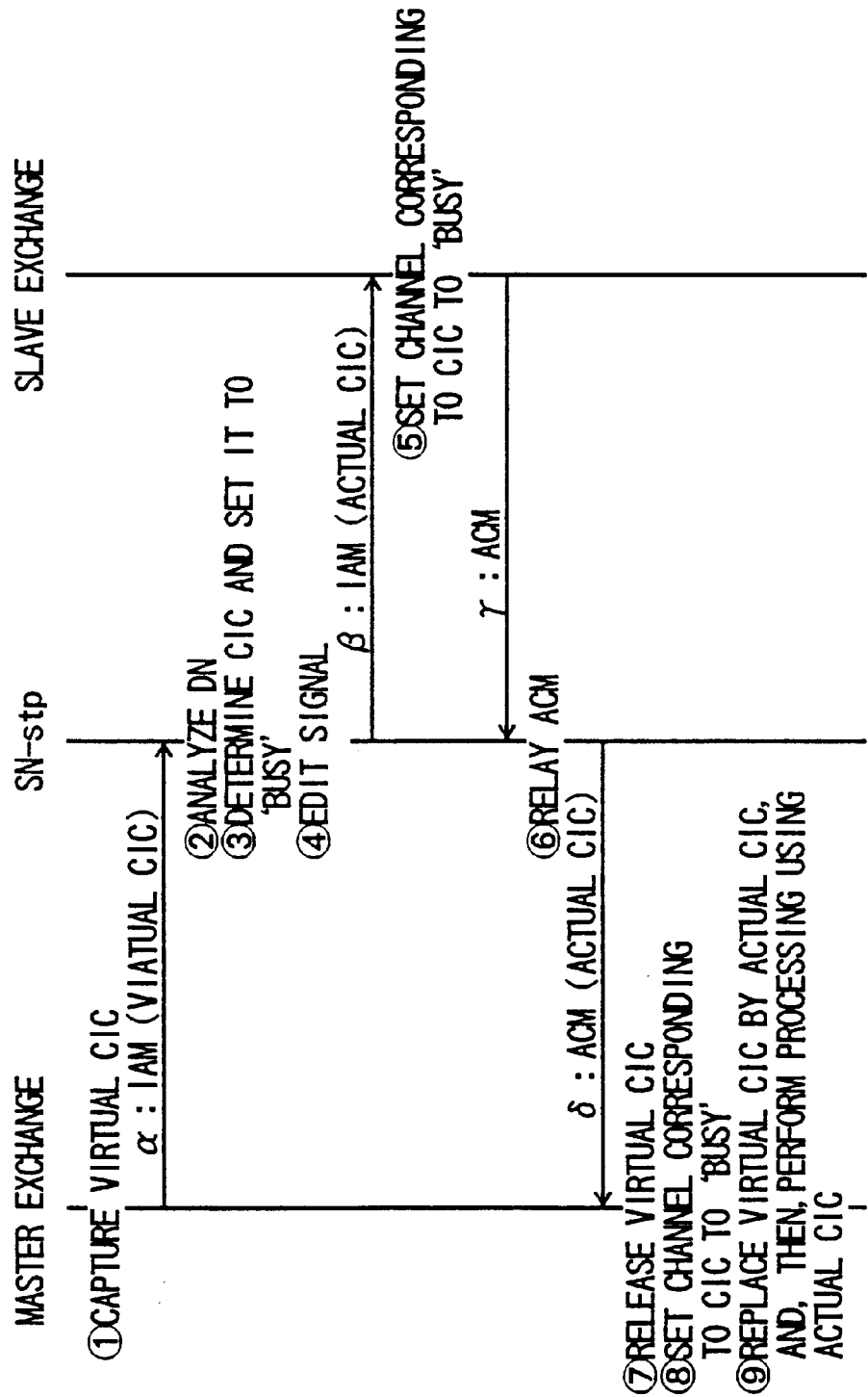
FIG. 11 shows an operation sequence of the network at the time of call establishment.

The number portability as the high-grade service will now be described as an example. FIG. 8 shows a general arrangement of a network, FIG. 9 shows a flow chart of a first embodiment of an exchange operation at a time of call establishment, FIG. 10 shows a flow chart of a first embodiment of an SN-stp-station operation at the time of call establishment, and FIG. 11 shows an operation sequence of the network at the time of call establishment. A master subscriber Sub-a1 (PN=111, NN=001), connected with the exchange A of a master station number PC=100, dials a subscriber number PN=333 (in a step S10 in FIG. 9), to which the number portability is applied. The TG management portion 33 determines, from this dial number DN, that connection to be made is not connection to a subscriber connected to the exchange A (in a step S12 of FIG. 9), and, thereby, the service scenario 32 of the exchange A requests to capture the pertinent TG.

The TG management portion 33 requests the virtual-CIC capture processing portion 34 to capture the virtual CIC (in a step S14 of FIG. 9), and the virtual-CIC capture processing portion 34 determines the virtual CIC which is the channel number of the circuit in the virtual manner. The TG management portion 33 edits an IAM signal ∝ as a call-out request signal having this virtual CIC, and sends the signal to the SN-stp station 20 (in a step S16 of FIG. 9).

As shown in FIG. 8, in this IAM signal ∝, a master station number OPC=100, a target station number DPC=200, CIC=1 (virtual CIC), CIC-2=NULL, DN (PN)=333 and DN (NN)=NULL.

The SN-stp station 20 of the station number PC=200 receives the IAM signal ∝ (in a step S20 of FIG. 10), the service scenario 24 of the SN-stp station extracts DN (PN)=333 from the IAM signal ∝, and the DN analysis portion 23 analyzes the extracted number. The DN analysis portion searches for, using the above-mentioned DN (PN)=333, DN analysis data, shown in FIG. 12A, in which PC, NN, idle/busy information and additional service information are set for each PN, and, then, as a result of the analysis, obtains the slave exchange B (PC=300) and the network number NN=003 (in a step S22 of FIG. 10). Then, the DN analysis portion 23 rewrites the DN analysis data (in which 'idle' is set as the idle/busy information) shown in FIG. 12B into the DN analysis data (in which 'busy' is set as the idle/busy information) shown in FIG. 12C (in a step S24 of FIG. 10). Thus, 'idle' is rewritten into 'busy'.

The intra-network inter-station CIC management portion 21 has, as shown in FIG. 13, an inter-station calling-CIC idle/busy table which is searched for using the master station number OPC and the target station number DPC. The intra-network calling-condition management portion 22 captures a idle CIC at the area corresponding to the slave exchange B (DPC=300), which is the result of the DN analysis, and OPC=100 of the IAM signal ∝, and changes the idle CIC into 'busy' (in a step S26 of FIG. 10). Then, the virtual CIC of the IAM signal ∝ is set in the CIC-2 area, and the captured CIC is set in the CIC area. Thus, the IAM signal β, shown in FIG. 8, is produced, in which signal DPC=300 so as to point to the slave exchange B, and the IAM signal β is transmitted (in a step S28 of FIG. 10).

Then, as shown in the sequence of FIG. 11, the slave exchange B sets the circuit, pointed to by the CIC area of the IAM signal β, to 'busy', produces an ACM signal γ as the response signal, and sends the signal to the SN-stp station 20.

As shown in FIG. 8, in the ACM signal γ, the master station number OPC=300, the target station number DPC=100, CIC=10 (actual CIC), CIC-2=1 (virtual CIC), DN (PN)=NULL and DN (NN)=NULL.

The SN-stp station 20 relays this ACM signal γ, and sends the signal to the master exchange A as an ACM signal 8, shown in FIG. 8.

FIG. 14 shows a flow chart of a second embodiment of an exchange operation at the time of reception of the ACM signal δ. The master exchange A receives the ACM signal δ (in a step S30), the TG management portion 33 gives the CH management portion 36 instructions to set the circuit, pointed to by the CIC area (actual CIC) of the ACM signal δ, to 'busy', and this circuit is secured (in a step S32). Then, an index for identifying a message for each call at a time of reception of the message such as the ACM signal or the like from that time is used as the actual CIC in the CIC area of the ACM signal δ (in a step S34), the virtual CIC in the CIC-2 area of the ACM signal δ is released.

Thus, when the high-grade service such as the number portability or the like will be realized, it is not necessary to capture the circuit for determination of a slave destination which is performed in the SN station in the related art, and, also, it is not necessary to perform signal transmission and reception (BEGIN, END) between the master exchange and the SCP for the conversion from the dial number DN into the actual slave directory number NN in the related art.

Figure 15A:
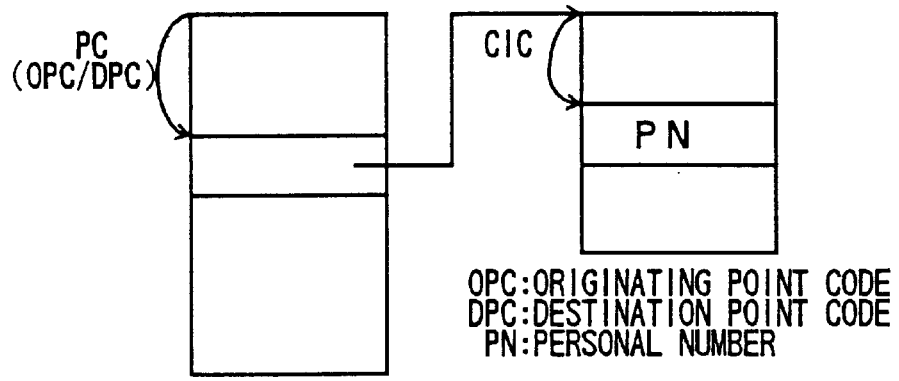
FIGS. 15A, 15B and 15C show a line-and-PN correspondence table.

The SN-stp station 20 has a subscriber database, and, also, because the inter-station signals such as the IAM signal, ACM signal and so forth pass through the SN-stp station 20, the SN-stp station can manage the calling conditions of the subscribers. The intra-network calling-condition management portion 22 of the SN-stp station 20, shown in FIG. 6, manages the conditions of the subscribers in the network, and manages the calling conditions of the subscribers, using the DN analysis data, shown in FIGS. 12A, 12B and 12C, and a line-and-PN correspondence table, shown in FIG. 15A. The line-and-PN correspondence table has the subscriber number PN stored at an area which is searched for using the station number PC (OPC or DPC) and CIC.

Figure 16:
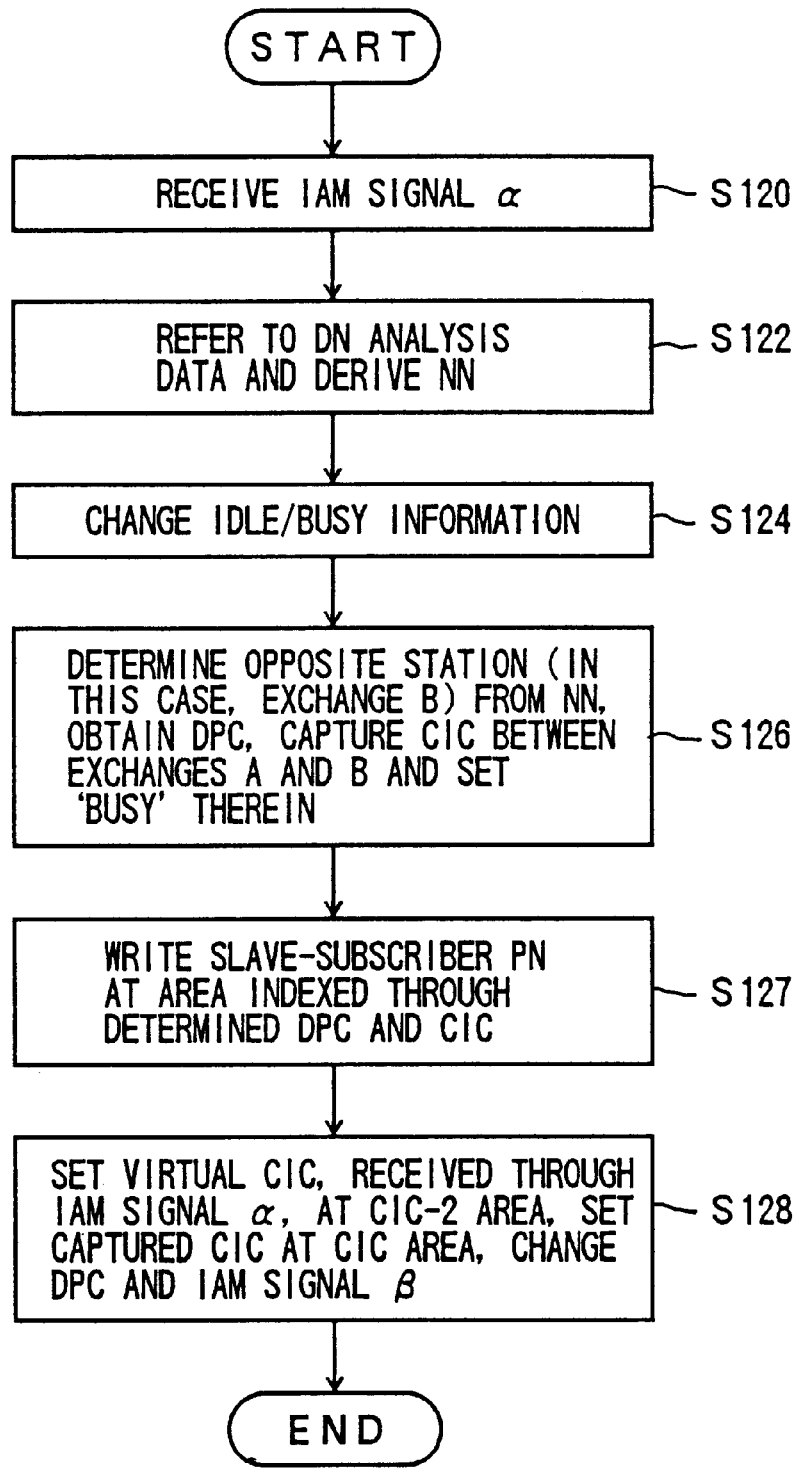
FIG. 16 shows a flow chart of a second embodiment of an SN-stp-station operation at the time of call establishment.

FIG. 16 shows a flow chart of a second embodiment of an SN-stp-station operation at the time of call establishment. The SN-stp station 20 receives the IAM signal ∝ (in a step S120), the service scenario 24 of the SN-stp station 20 extracts the DN (PN)=333 from the IAM signal ∝, and the DN analysis portion 23 analyzes it. The DN analysis portion 23 searches for the DN analysis data, in which the PC, NN, idle/busy information and additional service information are set for each PN, using the above-mentioned DN (PN)=333, and, as the result of the analysis, obtains the slave exchange B (PC=300) and network number NN=003 (in a step S122). Then, the DN analysis portion 23 rewrites the DN analysis data ('idle' being set in the idle/busy information) shown in FIG. 12B into the DN analysis data ('busy' being set in the idle/busy information) shown in FIG. 12C, so that 'idle' in the idle/busy information is changed into 'busy' (in a step S124).

The intra-network inter-station CIC management portion 21 of the SN-stp station 20 has the inter-station calling-CIC idle/busy table, which is searched for using the master station number OPC and target station number DPC, as shown in FIG. 13. The intra-network calling-condition management portion 22 captures the idle CIC at the area corresponding to the slave exchange B (DPC=300), which is the result of the DN analysis, and the OPC=100 of the IAM signal∝, and changes the idle CIC into 'busy' (in a step S126).

Figure 15B:
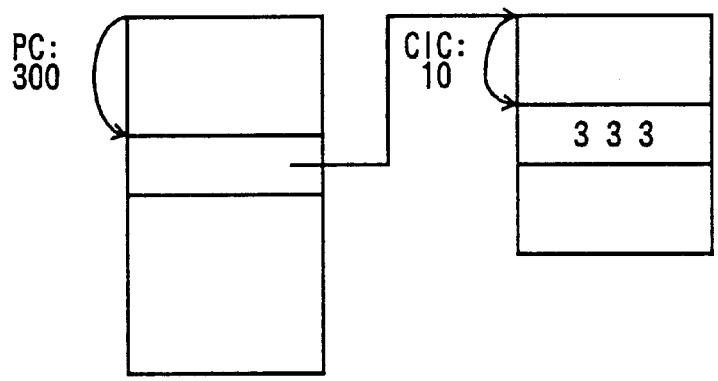

Then, as shown in FIG. 15B, PN=333, to which the number portability is applied, is written at the area pointed to by DPC=300 and CIC=10 (actual CIC), and the idle/busy information, which was searched for using the PN=333, of the DN analysis data, shown in FIG. 12B, is set to 'busy' (in a step S127). Then, the virtual CIC of the IAM signal ∝ is set in the CIC-2 area, the captured CIC is set in the CIC area, and the IAM signal β, shown in FIG. 8, is produced, in which signal DPC=300 so as to point to the slave exchange B, and the IAM signal β is transmitted (in a step S128).

Figure 15C:
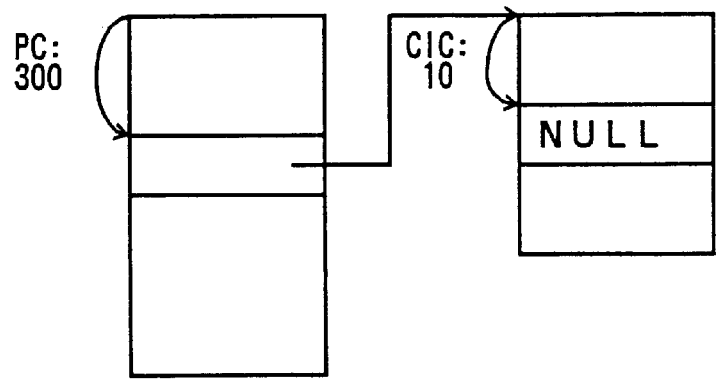
Figure 17:
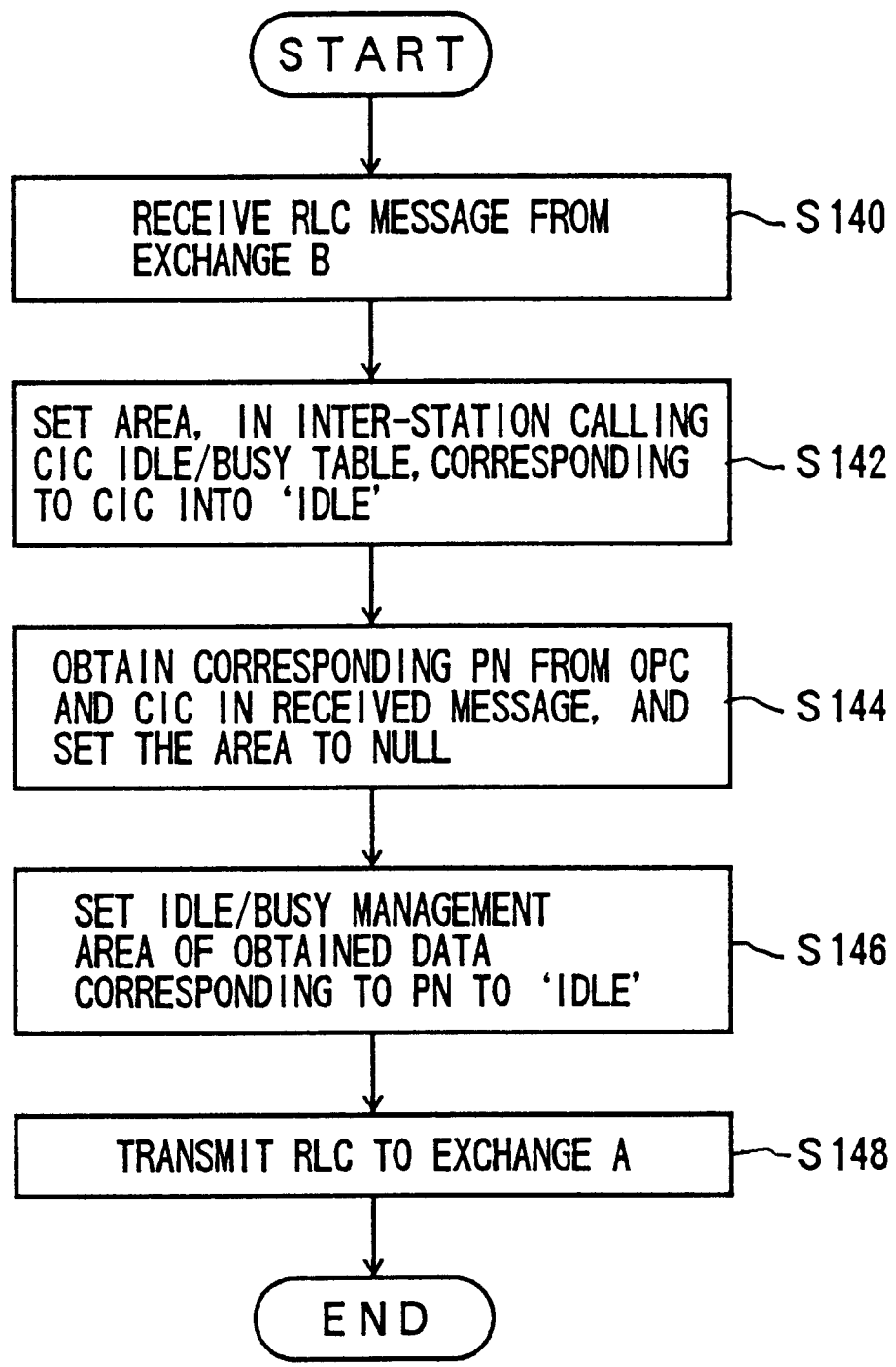
FIG. 17 shows a flow chart of the second embodiment of the SN-stp-station operation at a time of call release.
Figure 18:
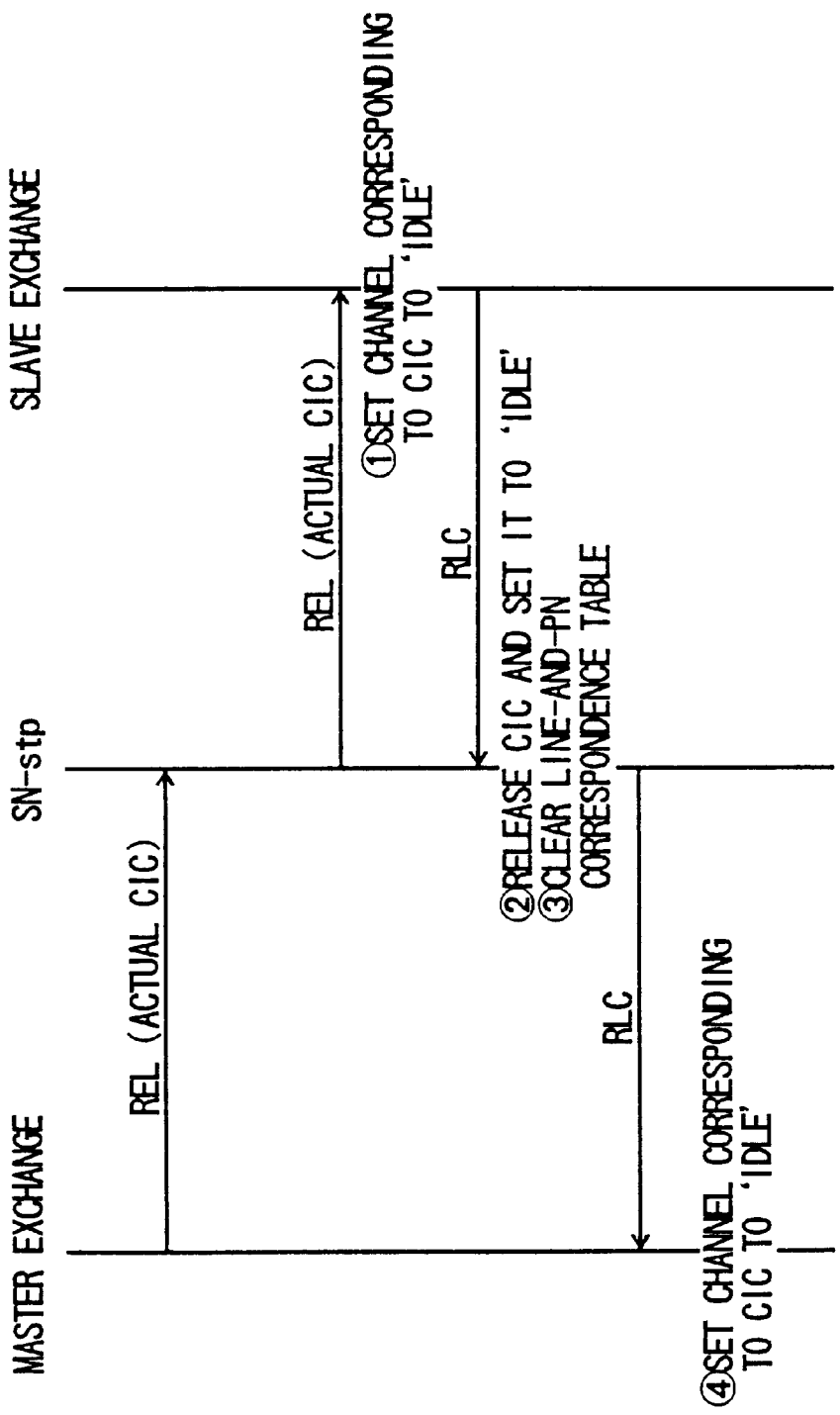
FIG. 18 shows an operation sequence of the network at the time of call release.

FIG. 17 shows a flow chart of the second embodiment of the SN-stp-station operation at the time of call release, and FIG. 18 shows an operation sequence of the network at the time of call release. The SN-stp station 20 receives an RLC message which is a response to an REL signal which gives instructions that the call is to be released (in a step S140). The intra-network inter-station CIC management portion 21 of the SN-stp station 20 rewrites the area, in the inter-station calling-CIC idle/busy table, shown in FIG. 13, pointed to by the DPC=300 and CIC=10 (actual CIC) in the RLC message, into NULL (in a step 142). Further, as shown in FIG. 15C, the area pointed to by DPC=300 and CIC=10 (actual CIC) is rewritten into NULL (in a step S144). Then, as shown in FIG. 12C, the idle/busy information, which was searched for using the PN=333, of the DN analysis data, is set to 'idle' (NULL) (in a step S146). Then, the RLC message is transmitted to the exchange A (in a step S148).

Thus, as a result of the SN-stp station 20 managing the subscriber conditions in the network, in a case where the subscriber Sub-a2 attempts to call the subscriber Sub-a1 while the subscriber Sub-b1 performs a telephone conversation, in the arrangement shown in FIG. 5, the SN-stp station 20 can determine the 'busy' condition of the subscriber Sub-b1, can inform the subscriber Sub-a2 of the 'busy' condition of the subscriber Sub-a1, can prevent resources in the network from being uselessly captured, and can reduce the load on the exchange.

An embodiment in which the virtual CIC has a service identifier and service determination processing in the SN-stp station is shortened will now be described.

Figure 19:
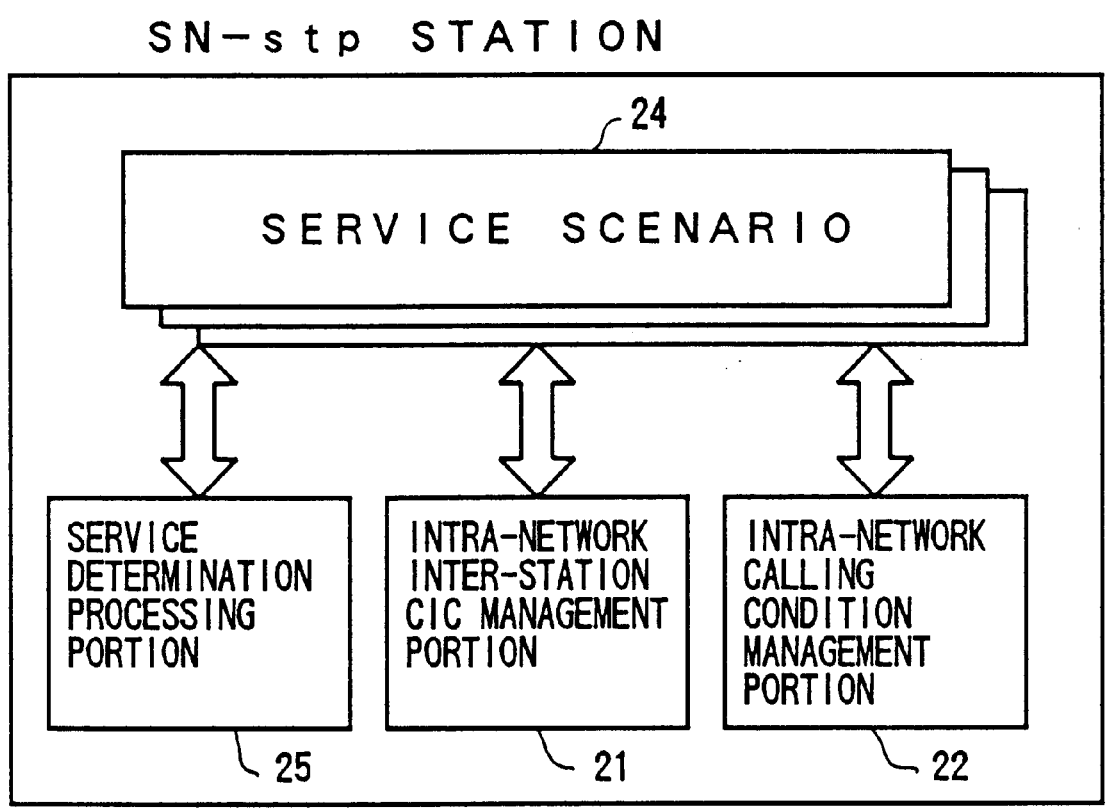
FIG. 19 shows a block diagram of a second embodiment of the SN-stp station.

FIG. 19 shows a block diagram of a second embodiment of the SN-stp station. In the figure, the intra-network inter-station CIC management portion 21 manages the circuits between the exchanges A, B and C which are connected with the SN-stp station 20. The intra-network calling-condition management portion 22 manages the calling condition for each dial number DN. A service determination processing portion 25 refers to the service identifier provided in the virtual CIC and determines which service scenario of the plurality of service scenarios 24 is to be used.

Figure 20:
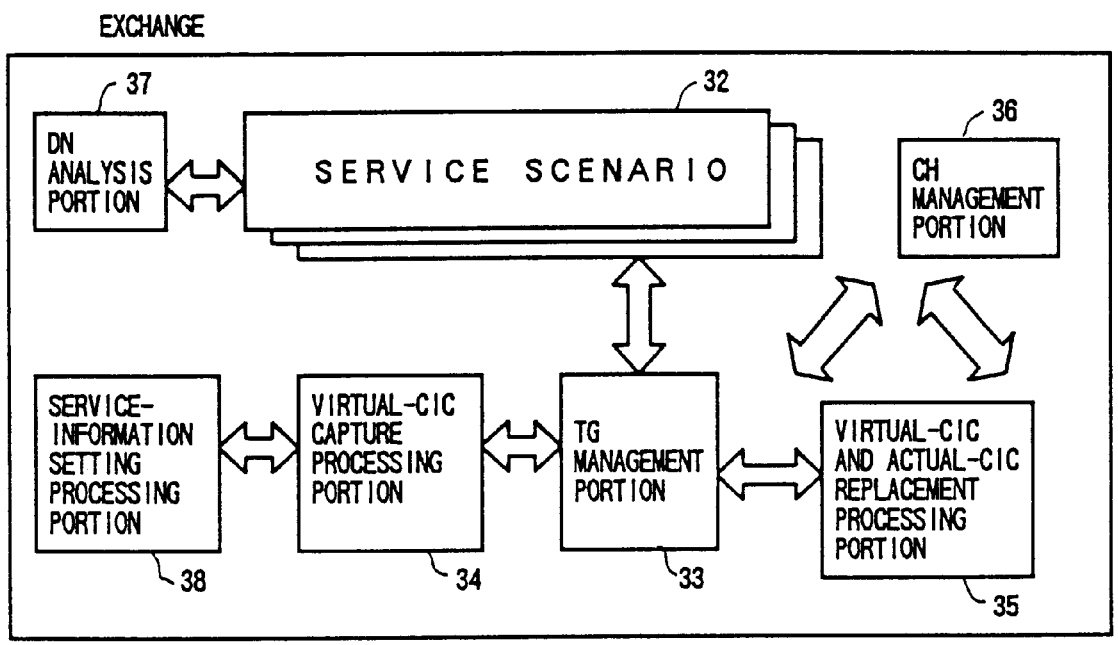
FIG. 20 shows a block diagram of a second embodiment of each exchange.

FIG. 20 shows a block diagram of a second embodiment of each exchange. In the figure, a DN analysis portion 37 analyzes the dial number DN transmitted from the master subscriber, and determines which service scenario of the plurality of service scenarios 32 is to be used. The determined service scenario requests the TG management portion to capture the pertinent TG in accordance with the dial number DN from the master subscriber. The TG management portion 33 requests the virtual-CIC capture processing portion 34 to capture the virtual CIC, and the virtual-CIC capture processing portion 34 determines not the actual circuit but the channel number of the circuit in the virtual manner. At this time, a service-information setting processing portion 38 adds, to the virtual CIC, the service identifier of the service determined by the DN analysis. The TG management portion 33 sends the call-out signal having this virtual CIC to the SN-stp station 20.

The virtual-CIC and actual-CIC replacement processing portion 35 receives the response signal from the SN-stp station 20, and replaces the virtual CIC in the response signal with the actual CIC. The CH management portion 36 manages the circuits which connect the exchanges, and secures the circuit, to which the above-mentioned actual CIC points.

A case where the number-portability service and the free-phone service are prepared in the SN-stp station 20 will now be described. Each service provides a function of converting the subscriber number PN or a free-phone number into the actual slave number NN (=network number). However, the database and the search method of one service are different from those of the other service. Therefore, it is necessary to execute the respective service scenarios.

When the DN analysis portion 37 of the master exchange refers to a DN analysis table, shown in FIG. 21, using the dial number DN, and the number portability (service classification=1000) or the free phone (service classification=2000) is obtained as the result of the analysis, the service-information setting processing portion 38 sets the service identifier in the most significant bits of the virtual CIC, and transmits the IAM signal to the SN-stp station 20.

It is predetermined that, in the case of the number portability, as shown in FIG. 22A, 01 is set in the most significant two bits of the virtual CIC of the IAM signal, and, in the case of the free phone, as shown in FIG. 22B, 10 is set in the most significant two bits of the virtual CIC of the IAM signal. The service determination processing portion 25 of the SN-stp station 20 checks the most significant two bits of the virtual CIC, and, thereby, the service can be identified. Thus, it is not necessary to analyze the received DN, and, thereby, the processing can be shortened.

Figure 23:
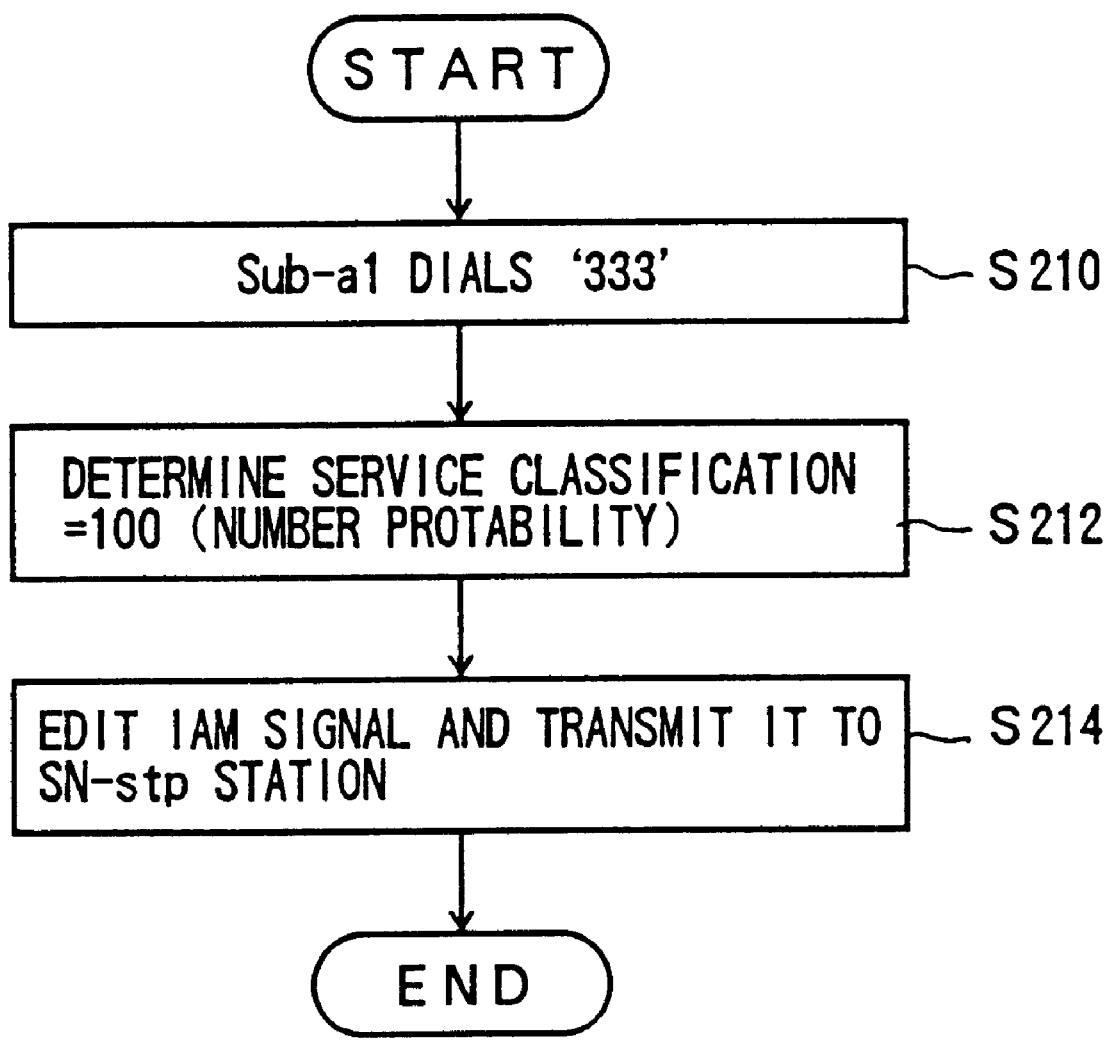
FIG. 23 shows a flow chart of a third embodiment of the exchange operation at the time of call establishment.

FIG. 23 shows a flow chart of a third embodiment of the exchange operation at the time of call establishment. The master subscriber Sub-a1 (PN=111, NN=001) connected to the exchange A of the master station number PC=100 dials the subscriber number PN=333, to which the number portability is applied (in a step S210). The DN analysis portion 37 determines the service classification=1000 from this dial number DN (in a step S212). The service-information setting processing portion 38 edits the IAM signal, shown in FIG. 22A, and sends it to the SN-stp station 20 (in a step S214).

Figure 24:
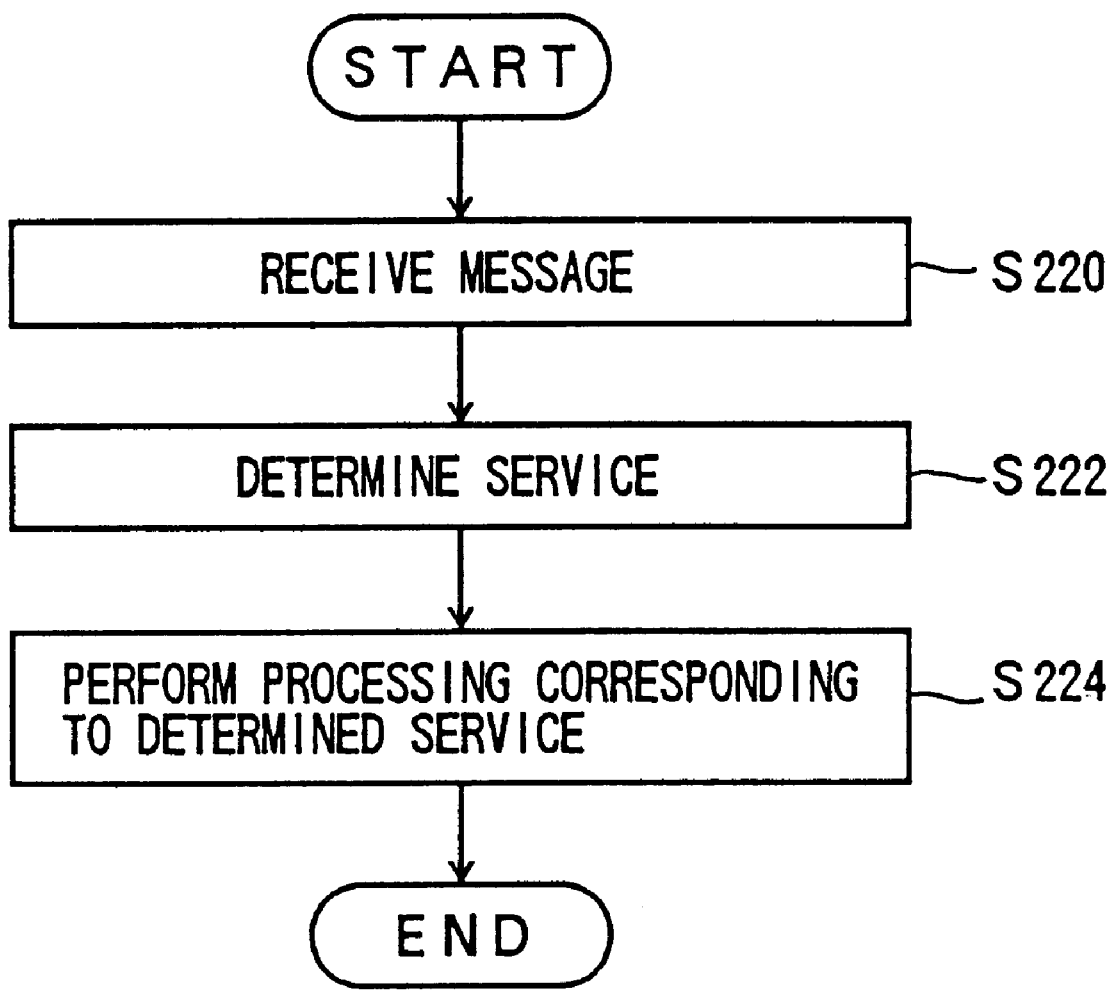
FIG. 24 shows a flow chart of a third embodiment of the SN-stp-station operation at the time of call establishment.
Figure 25:
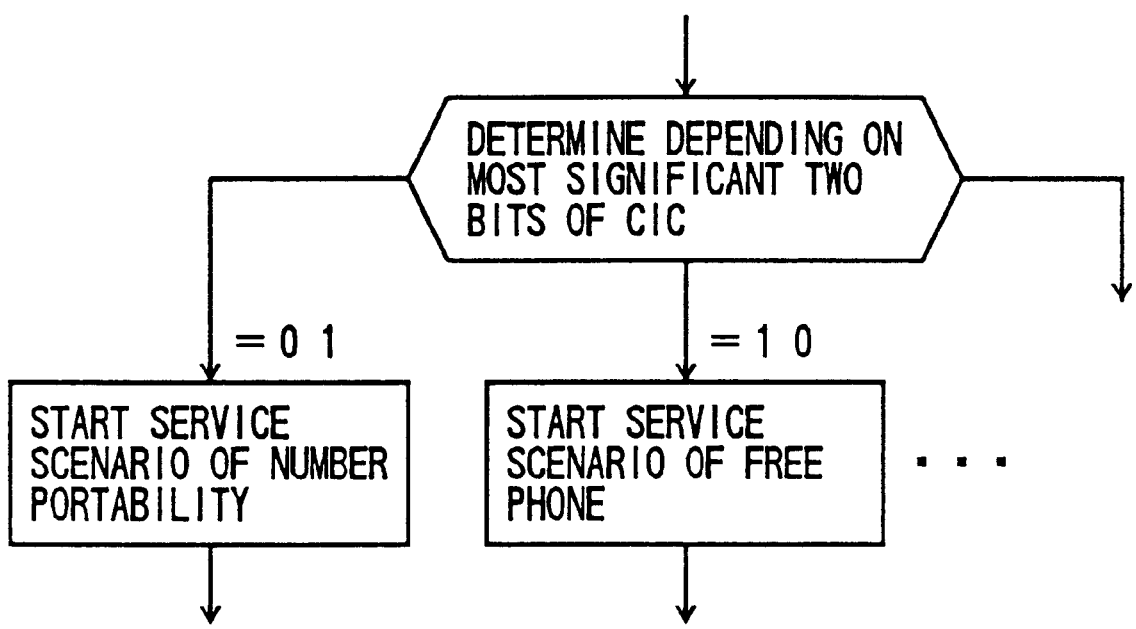
FIG. 25 shows a determination logic, in accordance with which a service determination processing portion determines a service to be carried out.

FIG. 24 shows a flow chart of a third embodiment of the SN-stp-station operation at the time of call establishment. The SN-stp station 20 receives the IAM signal, shown in FIG. 22A (in a step S220), and the service determination processing portion 25 checks the most significant two bits of the virtual CIC and identifies the service in accordance with the determination logic, shown in FIG. 25 (in a step S222).

Then, the processing corresponding to the determined service is performed (in a step S224).

Thus, as a result of the SN-stp station having the intra-network inter-station CIC management portion 21 and intra-network calling-condition management portion 22, it is possible to reduce the umber of operations of capturing the resources in the network, and to reduce the signal traffic between the exchanges. Further, as a result of the SN-stp station managing the subscriber conditions, a service, such as call-forwarding, camp-on or the like, which service is carried out depending on the condition of the subscriber, can be carried out without applying a load on the traffic in the network.

Further, because signal transmission and reception is enabled through the virtual CIC, even when the number of services increases, it is possible to cope with the increase simply by adding the service scenarios in the SN-stp station. Further, as a result of the SN-stp station determining the CIC between the stations, it is possible to prevent the signals from colliding at the time of call establishment. For this purpose, there is also a method in which it is determined that both the exchanges, which are connected through a calling path, are a line-capture control station and a line-capture to-be-controlled station, respectively, and the line-capture control station captures the calling path. However, in this method, although it is possible to prevent the channels from colliding, it is not possible to check the actual condition of the slave destination.

The virtual-CIC capture processing portion 34 corresponds to a virtual-index capture processing portion, the virtual-CIC and actual-CIC replacement processing portion 35 corresponds to a replacement processing portion, and the intra-network inter-station CIC management portion 21 corresponds to an intra-network inter-station index management portion.

The present invention is not limited to the above-described embodiments, and variations and modifications may be made without departing from the scope of the present invention.

The present application is based on Japanese priority application No. 10-357836 filed on Dec. 16, 1998, the entire contents of which are hereby incorporated by reference.

What is claimed is:

1. A network call control system in which a network comprises a plurality of exchanges, each exchange of said plurality of exchanges and a service station, which carries out network services, being connected through a call control signal line, and the respective exchanges of said plurality of exchanges being connected through circuits, wherein:
   each exchange of said plurality of exchanges comprises a virtual-index capture processing portion which captures a virtual circuit identification index; and
   said exchange specifies the virtual circuit identification index and makes a call-out request to said service station.

2. The network call control system as claimed in claim 1, wherein each exchange of said plurality of exchanges comprises a replacement processing portion which receives a response signal sent from an opposite station in response to the call-out request, and replaces the virtual circuit identification index with an actual circuit identification index.

3. The network call control system as claimed in claim 1, wherein:
   said service station comprises an intra-network inter-station management portion which manages the circuit identification indexes between the respective exchanges of said plurality of exchanges; and
   said service station receives the call-out request and captures the actual circuit identification index.

4. The network call control system as claimed in claim 1, wherein said service station comprises an intra-network calling-condition management portion which manages a calling condition for each dial number.

5. The network call control system as claimed in claim 2, wherein each exchange of said plurality of exchanges comprises a service-information setting processing portion which adds service identification information to the virtual circuit identification index in accordance with a result of analysis of a dial number.

6. The network call control system as claimed in claim 1, wherein said service station comprises a service determination processing portion which determines, from service identification information added to the virtual circuit identification index, the service to be carried out.

* * * * *